(12) United States Patent
McVickar

(10) Patent No.: US 7,699,331 B2
(45) Date of Patent: Apr. 20, 2010

(54) MOTORCYCLE-STANCE ALTERATION KIT

(76) Inventor: Matthew McVickar, 2040 Caddington Dr., Rancho Palos Verdes, CA (US) 90275

( * ) Notice: Subject to any disclaimer, the term of this patent is extended or adjusted under 35 U.S.C. 154(b) by 236 days.

(21) Appl. No.: 11/804,458

(22) Filed: May 18, 2007

(65) Prior Publication Data

US 2008/0284129 A1 Nov. 20, 2008

(51) Int. Cl.
*B62K 21/12* (2006.01)
(52) U.S. Cl. .................... 280/279; 280/280; 280/288.4; 74/551.1; 74/551.2; 74/551.3; 74/551.4; 74/551.5; 74/551.6; 74/551.7; 74/551.8
(58) Field of Classification Search ................ 280/279, 280/280, 288.4; 74/551.1, 551.2, 551.3, 74/551.4, 551.5, 551.6, 551.7, 551.8
See application file for complete search history.

(56) References Cited

U.S. PATENT DOCUMENTS

| | | | | |
|---|---|---|---|---|
| 1,387,215 A * | 8/1921 | Wagner | ...................... | 280/279 |
| 4,896,559 A * | 1/1990 | Marier et al. | .............. | 74/551.4 |
| 5,253,544 A * | 10/1993 | Allsop et al. | ............... | 74/551.1 |
| 5,273,302 A * | 12/1993 | Ureel | .......................... | 280/279 |
| 6,192,773 B1 * | 2/2001 | Liao | .......................... | 74/551.3 |
| 6,953,201 B1 * | 10/2005 | VanDeMortel | .............. | 280/276 |
| 7,018,126 B2 * | 3/2006 | Henricksen | ................. | 403/286 |
| 7,163,224 B1 * | 1/2007 | Song et al. | ................... | 280/276 |
| 2002/0041077 A1 * | 4/2002 | Hideo et al. | ............. | 280/288.4 |
| 2008/0315551 A1 * | 12/2008 | Battistini | .................... | 280/279 |
| 2009/0096185 A1 * | 4/2009 | Wu et al. | ..................... | 280/279 |

* cited by examiner

*Primary Examiner*—Lesley Morris
*Assistant Examiner*—Marlon A Arce
(74) *Attorney, Agent, or Firm*—Tope-McKay & Assoc.; Marcus Risso

(57) ABSTRACT

A motorcycle-stance alteration kit is described. The kit includes a handlebar clamp, a fork clamp, and a footpeg extension. The handlebar clamp is formed to connect with a motorcycle's fork clamp and reposition the motorcycle's handlebar to alter a user's riding stance. The fork clamp is configured to be attached with motorcycle forks to the motorcycle's frame. The fork clamp includes a horizontal mounting surface that is formed to offset the fork's rake angle to cause the horizontal mounting surface to rest in a substantially horizontal alignment with respect to a ground surface. Finally, the footpeg extension is formed to connect with and between a motorcycle frame and footpeg. Thus, the footpeg extension effectively repositions the footpeg to alter the user's riding stance.

13 Claims, 22 Drawing Sheets

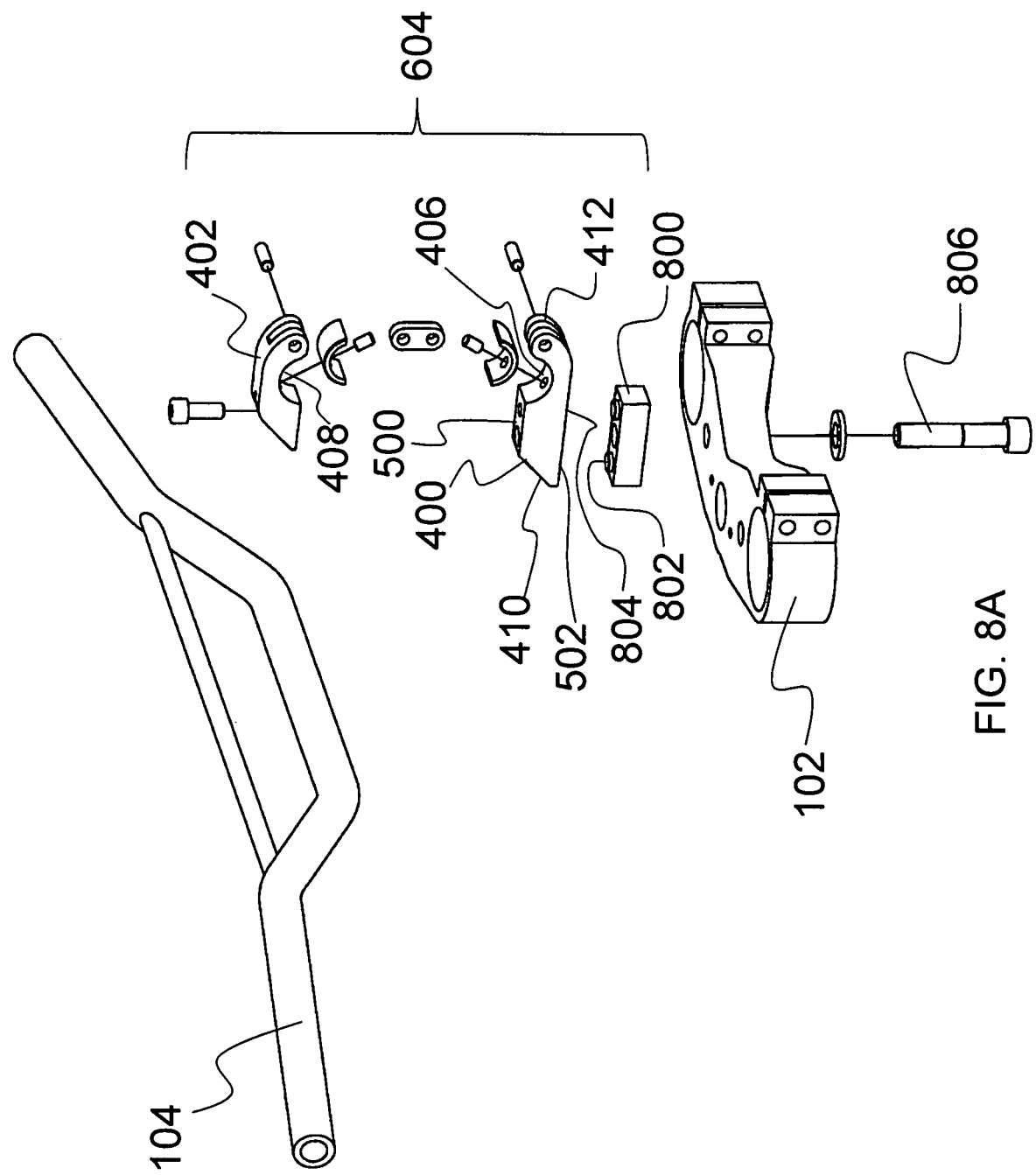

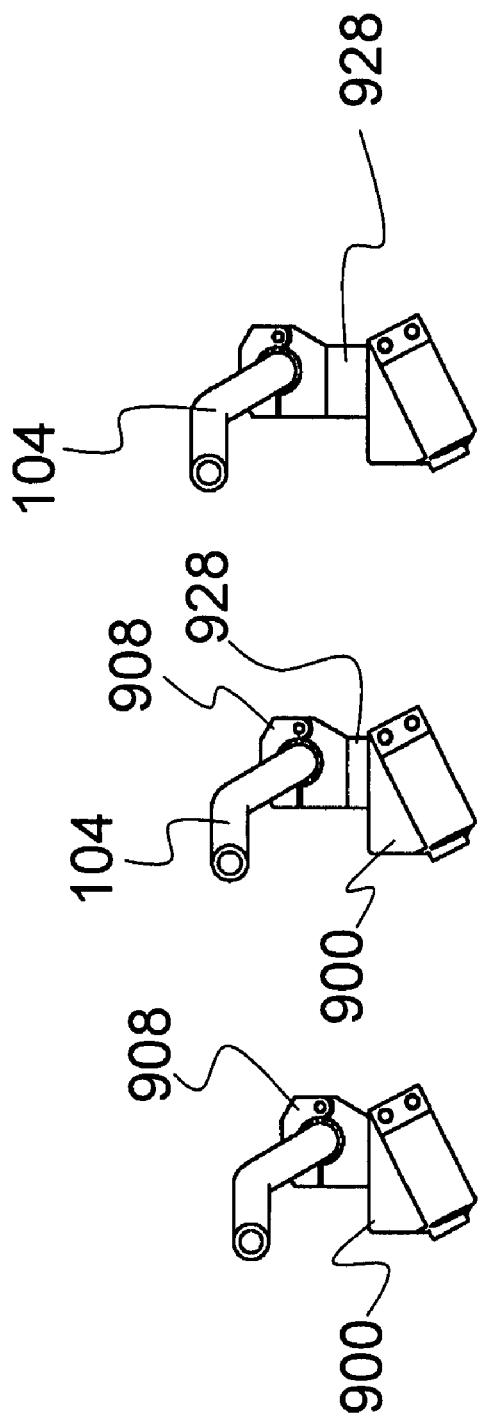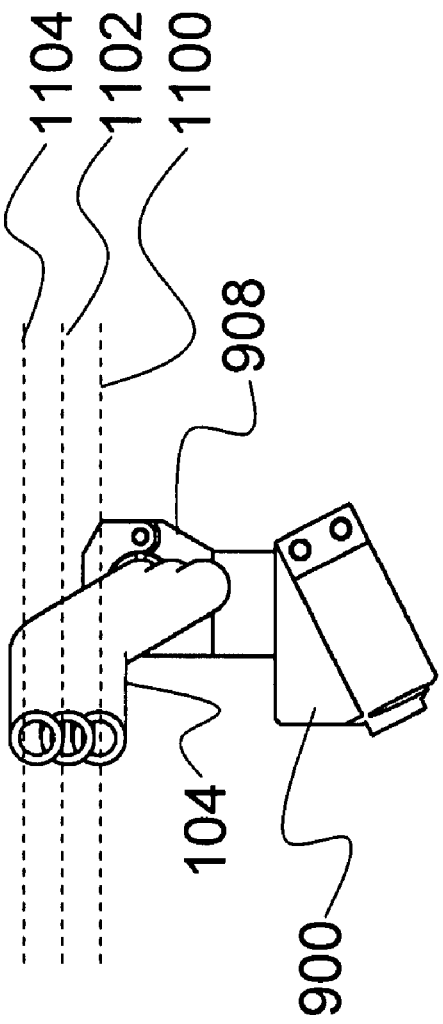

H=Horizontal Handlebar Movement
V=Vertical Handlebar Movement
A=Rake Angle
R= Riser Block Height

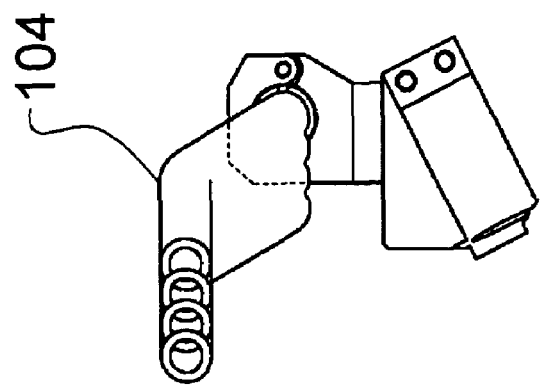
FIG. 12E
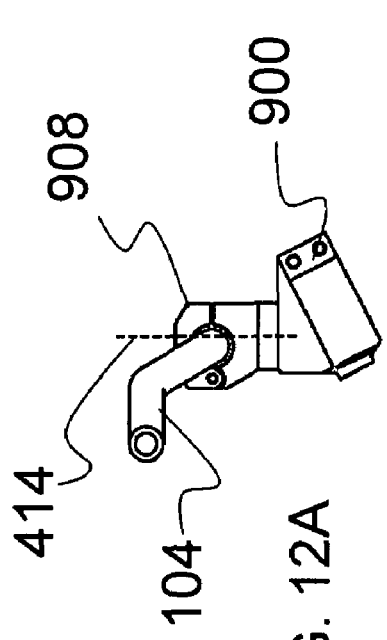
FIG. 12A
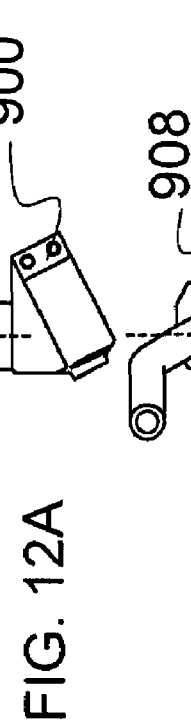
FIG. 12B
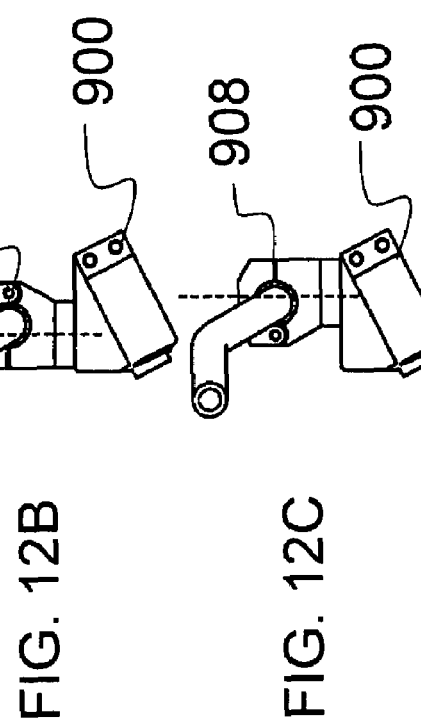
FIG. 12C
FIG. 12D

MOTORCYCLE-STANCE ALTERATION KIT

BACKGROUND OF THE INVENTION (1) Field of Invention

The present invention relates to a motorcycle accessory and, more particularly, to an accessory for attaching with a motorcycle to alter a rider's stance and riding position, including a footpeg extension and handlebar extension kit.

(2) Description of Related Art

Riding motorcycles has long been a favored sport among enthusiasts. As the sport has progressed it has taken many different directions, leading to the development of a variety of motorcycles, including street motorcycles and off-road motorcycles. As manufacturers develop their motorcycles, they are typically restricted to manufacturing for the masses. In doing so, this has led to motorcycles that are developed for riders of an average height and stature. While optimal for a rider of an average height, the typical motorcycle is not optimal for riders having alternative statures. For example, tall riders are forced to ride motorcycles that do not properly address their natural riding stance. In other words, the handlebars and footpegs on original motorcycles are not properly positioned to allow a taller rider to ride comfortably. In the very least, the handlebars and footpegs are placed at sub-optimal positions for taller (and shorter) riders.

Thus, a continuing need exists for a motorcycle-stance alteration kit that allows a user to alter the riding stance of a motorcycle.

SUMMARY OF INVENTION

The present invention relates to a motorcycle-stance alteration kit. The kit includes a handlebar clamp for attaching with a motorcycle's fork clamp. The handlebar clamp includes a base and a cap hingedly connected with the base. The base also includes an arcuate recess therein and the cap also includes an arcuate recess. When the cap is positioned upon the base, the arcuate recesses are aligned to allow for placement of a handlebar there between. The base is formed to align with and connect with the motorcycle's fork clamp, with the base being an elongated base having a first portion, a second portion, and a center portion there between. The arcuate recess is formed in the base such that it is offset from the center portion and resides substantially within the second portion, whereby use of the handlebar clamp allows a user to reposition a handlebar to alter a user's riding stance.

A link can also be included that has a first end and a second end. In this aspect, the first end is pivotally connected with the base and the second end is pivotally connected with the cap, thereby hingedly connecting the base with the cap through the link. To facilitate such a connection, the base includes a slot and the cap includes a slot, where the link is positioned within the slot of each the cap and base. Additionally, the link is affixed with each of the cap and the base using a pin to pivotally connect the link with each of the cap and base.

To accommodate handlebars of varying diameters, the present invention also includes a set of arcuate adapters for positioning within the arcuate recesses. Each arcuate adapter is connected with an arcuate recess using a dowel pin.

The base also includes a top side and a bottom side, with the arcuate recess being formed in the top side. The base further includes an arcuate protrusion extending from the bottom side of the first portion, with the arcuate protrusion being formed to align with and mate with a corresponding arcuate recess in the motorcycle's fork clamp.

In yet another aspect, the present invention further comprises a riser block having a pair of protrusions extending therefrom. In this aspect, the base includes a top side and a bottom side, with the arcuate recess being formed in the top side and a pair of depressions formed substantially within the first portion of the bottom side that correspond to the pair of protrusions on the riser block. Both the base and riser block include a bolt hole therethrough such that when the pair of protrusions are connected with the pair of depressions, the bolt holes are aligned, thereby allowing a user to connect the riser block and base with a motorcycle's fork clamp to elevate a user's riding stance.

The kit also includes a footpeg extension for connecting with a motorcycle frame. The footpeg extension has a first side and a second side and is further elongated to have a first portion, a second portion, and a center portion therebetween. The footpeg extension includes a footpeg mount attached with the first side (i.e., formed with or separately formed and attached with) such that the footpeg mount is offset from the center portion and substantially within the second portion. The footpeg mount is also formed to connect with a motorcycle's footpeg, with the first portion being formed to connect with the motorcycle frame, thereby allowing a user to connect the footpeg extension with the motorcycle frame and connect the footpeg with the footpeg mount to alter the user's riding stance.

In another aspect, the footpeg mount includes two footpeg mount pin bores therethrough to accommodate a footpeg mount pin. The footpeg mount also includes a sufficient amount of space between the two mount pin bores to accommodate a motorcycle's footpeg and a footpeg spring therebetween. The footpeg mount further includes a retaining pin hole therethrough that intersects one of the footpeg mount pin bores for placement of a retaining pin therein. In operation, a user can place a footpeg and footpeg spring between the two footpeg mount pin bores, with the footpeg mount pin being placed through the footpeg mount pin bores, the footpeg, and footpeg spring, with the retaining pin being placed through the retaining pin hole to contact the footpeg mount pin and thereby affix the footpeg, the footpeg spring, and the footpeg mount pin with the footpeg mount.

Additionally, the footpeg mount is formed to include a sufficient amount of space between the two footpeg mount pin bores to accommodate a motorcycle's original equipment manufacturer (OEM) footpeg and OEM footpeg spring therebetween.

In another aspect, the first portion of the footpeg extension includes a pair of bolt holes therethrough that are formed to accommodate OEM bolts. The pair of bolt holes are formed to align with corresponding threaded holes in a motorcycle frame, thereby allowing a user to position the footpeg extension against the motorcycle frame and use the OEM bolts to affix the footpeg extension with the motorcycle frame to alter the user's riding stance.

In yet another aspect, the present invention further comprises a clevis-pin, a clevis-pin retaining pin, a wedge block, and a wedge block set screw. In this aspect, the first portion includes a clevis-pin bore therethrough that has a long axis that is alignable with flanges of an OEM footpeg clevis affixed to a motorcycle frame. The first portion further includes a clevis-pin retaining pin hole therethrough, where the retaining pin hole has a long axis that approximately intersects the long axis of the clevis-pin bore. The first portion further includes a tapered pocket formed in the second side of the footpeg extension with a threaded hole formed through the first portion that intersects the tapered pocket. Thus, the footpeg extension can be attached with the motorcycle frame by positioning the footpeg extension over an OEM footpeg clevis, capturing the wedge block between the tapered pocket and the frame. The clevis-pin is then inserted through both flanges of the OEM footpeg clevis and the clevis-pin bore, with the clevis-pin retaining pin being positioned through the retaining pin hole to affix the footpeg extension with the motorcycle frame. The wedge block set screw is thereafter screwed through the threaded hole to drive the wedge block into the tapered pocket. Thus, the wedge block set screw is tightened to prevent the footpeg extension from rotating about the long axis of the clevis-pin.

In yet another aspect, the present invention further comprises a clevis-pin, a clevis-pin retaining pin, and a set screw. Additionally, the first portion includes a clevis-pin bore therethrough that has a long axis that is alignable with flanges of an OEM footpeg clevis affixed to a motorcycle frame. The first portion further includes a clevis-pin retaining pin hole therethrough. The clevis-pin retaining pin hole has a long axis that approximately intersects the long axis of the clevis-pin bore. Additionally, the first portion includes a set screw hole therethrough that has a long axis that is aligned to contact a motorcycle frame when the footpeg extension is attached with the motorcycle frame. Additionally, the set screw hole is threaded to accommodate the set screw. Thus, the footpeg extension can be attached with the motorcycle frame by inserting the clevis-pin through both flanges of an OEM footpeg clevis and the clevis-pin bore, with the clevis-pin retaining pin being positioned through the retaining pin hole to affix the footpeg extension with the motorcycle frame, and where the set screw can be positioned through the set screw hole to contact the motorcycle frame and using the threads, the set screw can be tightened against the motorcycle frame to prevent the footpeg extension from rotating about the long axis of the clevis-pin.

In another aspect, the present invention includes a motorcycle fork clamp and a bar clamp. The fork clamp is formed to connect with motorcycle forks having a rake angle. The fork clamp also includes a horizontal mounting surface, with the horizontal mounting surface having an angle and being formed such that when the fork clamp is attached with motorcycle forks, the angle of the horizontal mounting surface offsets the rake angle to cause the horizontal mounting surface to rest in a substantially horizontal alignment with respect to a ground surface. The fork clamp is also formed to include an adjustment apparatus at the horizontal mounting surface for connecting with a bar clamp. The adjustment apparatus is formed to allow for fore and aft connection positions with the bar clamp. Additionally, the bar clamp is formed to attach with the adjustment apparatus such that when connected with a handlebar, the bar clamp is used to attach the handlebar to the fork clamp, whereby a user can alter the riding stance by connecting the bar clamp at one of the fore and aft connection positions.

In yet another aspect, the horizontal mounting surface includes a fore side and an aft side. Furthermore, the adjustment apparatus includes at least three bolt holes formed through the horizontal mounting surface. The bolt holes are formed in linear alignment from the fore side to the aft side. Additionally, the bar clamp includes at least two receiving mechanisms for receiving two bolts positioned through two of the three bolt holes, thereby allowing a user to selectively adjust a fore and aft position of the bar clamp by selecting two of the three bolt holes for use with connecting the bar clamp to the fork clamp.

In another aspect, the receiving mechanisms are threaded bolt holes.

In yet another aspect, the fork clamp includes depressions formed proximate the bolt holes and the bar clamp includes corresponding protrusions proximate the receiving mechanisms, thereby allowing a user to affix the bar clamp with the fork clamp by mating the protrusions with the depressions.

In yet another aspect, the base is an elongated base having a first portion, a second portion, and a center portion therebetween. The arcuate recess is formed in the base such that it is offset from the center portion and substantially within the second portion. Additionally, the bar clamp is formed such that it can be reversibly connected with the fork clamp such that the second portion can be selectively positioned proximate the fore or aft positions of the fork clamp, whereby use of the bar clamp allows a user to reposition a handlebar to alter a user's riding stance.

In yet another aspect, the riser is configured to connect with and between the horizontal mounting surface and the bar clamp. The riser includes a top side and a bottom side. The bottom side includes protrusions that are formed to mate with the depressions in the horizontal mounting surface and the top side includes depressions formed to mate with the protrusions on the bar clamp.

Finally, as can be appreciated by one skilled in the art, the present invention also comprises a method for forming and using the motorcycle-stance alteration kit described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8A is an exploded-view illustration of the handlebar clamp according to the present invention;

FIG. 11A is a side-view illustration of the handlebar clamp and fork clamp according to the present invention, illustrating the handlebar clamp as attached to the fork clamp without a riser;

FIG. 11B is a side-view illustration of the handlebar clamp and fork clamp according to the present invention, illustrating the handlebar clamp as attached to the fork clamp with a small riser;

FIG. 11C is a side-view illustration of the handlebar clamp and fork clamp according to the present invention, illustrating the handlebar clamp as attached to the fork clamp with a large riser;

FIG. 11D is a side-view illustration of the handlebar clamp and fork clamp according to the present invention, illustrating a superimposed image of the handlebar positions as depicted in FIGS. 11A-11C;

FIG. 12A is a side-view illustration of the handlebar clamp and fork clamp according to the present invention, illustrating handlebar clamp as attached with the fork clamp to hold the handlebar in a first position;

FIG. 12B is a side-view illustration of the handlebar clamp and fork clamp according to the present invention, illustrating handlebar clamp as attached with the fork clamp to hold the handlebar in a second position;

FIG. 12C is a side-view illustration of the handlebar clamp and fork clamp according to the present invention, illustrating handlebar clamp as attached with the fork clamp to hold the handlebar in a third position;

FIG. 12D is a side-view illustration of the handlebar clamp and fork clamp according to the present invention, illustrating handlebar clamp as attached with the fork clamp to hold the handlebar in a fourth position;

FIG. 12E is a side-view illustration of the handlebar clamp and fork clamp according to the present invention, illustrating a superimposed image of the handlebar positions as depicted in FIGS. 12A-12D;

DETAILED DESCRIPTION

Figure 1:
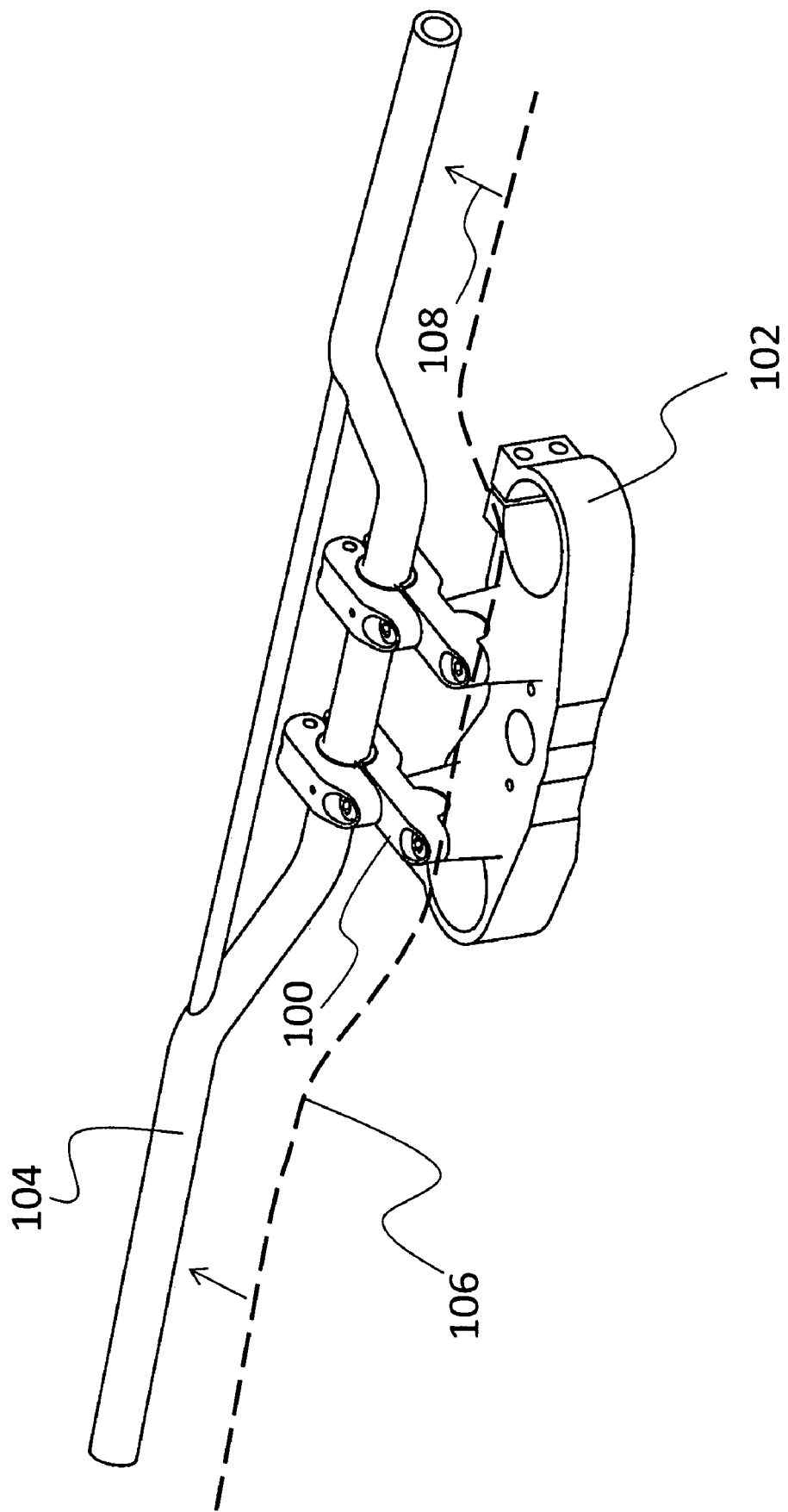
FIG. 1 is a rear, perspective-view illustration of a handlebar clamp according to the present invention, depicted as being connected with both a fork clamp and a handlebar.

The present invention relates to a motorcycle accessory and, more particularly, to an accessory for attaching with a motorcycle to alter a rider's stance and riding position, including a footpeg extension and handlebar extension kit. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, fore, aft, clockwise and counter clockwise have been used for convenience purposes only and are not intended to imply any particular fixed direction. Instead, they are used to reflect relative locations and/or directions between various portions of an object.

(1) Description

The present invention relates to a motorcycle-stance alteration kit. The kit is formed to alter both the handlebar and footpeg positions on original equipment manufacturer (OEM) motorcycles. In other words, the kit is used with OEM motorcycles to reposition the handlebars and footpegs, thereby altering the riding stance to allow riders of various statures to ride comfortably. Thus, the kit has two basic parts, the handlebar extension and the footpeg extension. For clarity, each of the handlebar extension and footpeg extension will be described separately.

(1.1) Handlebar Extension

The present invention includes a handlebar extension that is formed to relocate a motorcycle's original equipment manufacturer (OEM) handlebar to allow a user to alter the riding stance. As shown in FIG. 1, the handlebar extension includes a handlebar clamp 100 for attaching with a motorcycle's fork clamp 102. As can be appreciated by one skilled in the art, the motorcycle's fork clamp 102 is typically used to hold the motorcycle forks in place and attach them with the motorcycle's frame. Additionally, the fork clamp 102 attaches with a handlebar 104 to allow a user to steer the motorcycle.

With respect to the present invention, the handlebar clamp 100 is formed in such a way that it relocates the position of the handlebar 104, thereby altering the riding stance of the rider. The dashed line 106 depicts the OEM riding stance of the prior art. Using the handlebar clamp 100 of the present invention, the handlebar 104 is effectively moved forward 108 to accommodate riders of an alternative stature (e.g., taller riders).

Figure 2:
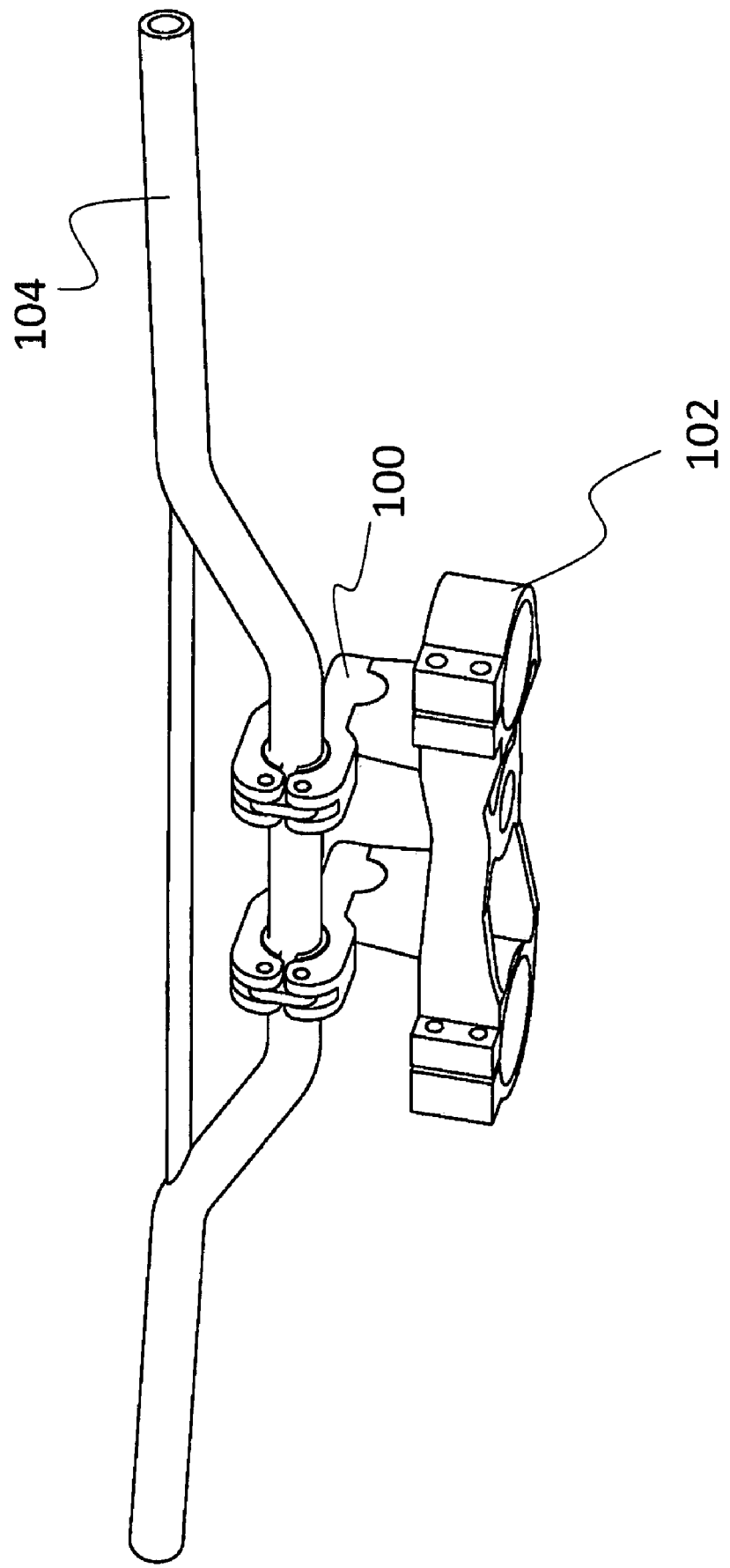
FIG. 2 is a front, perspective-view illustration of the handlebar clamp according to the present invention, depicted as being connected with both a fork clamp and a handlebar.

FIG. 2 is a front-view illustration of the handlebar clamp 100, showing the handlebar 104 in its new position with respect to the fork clamp 102.

Figure 3:
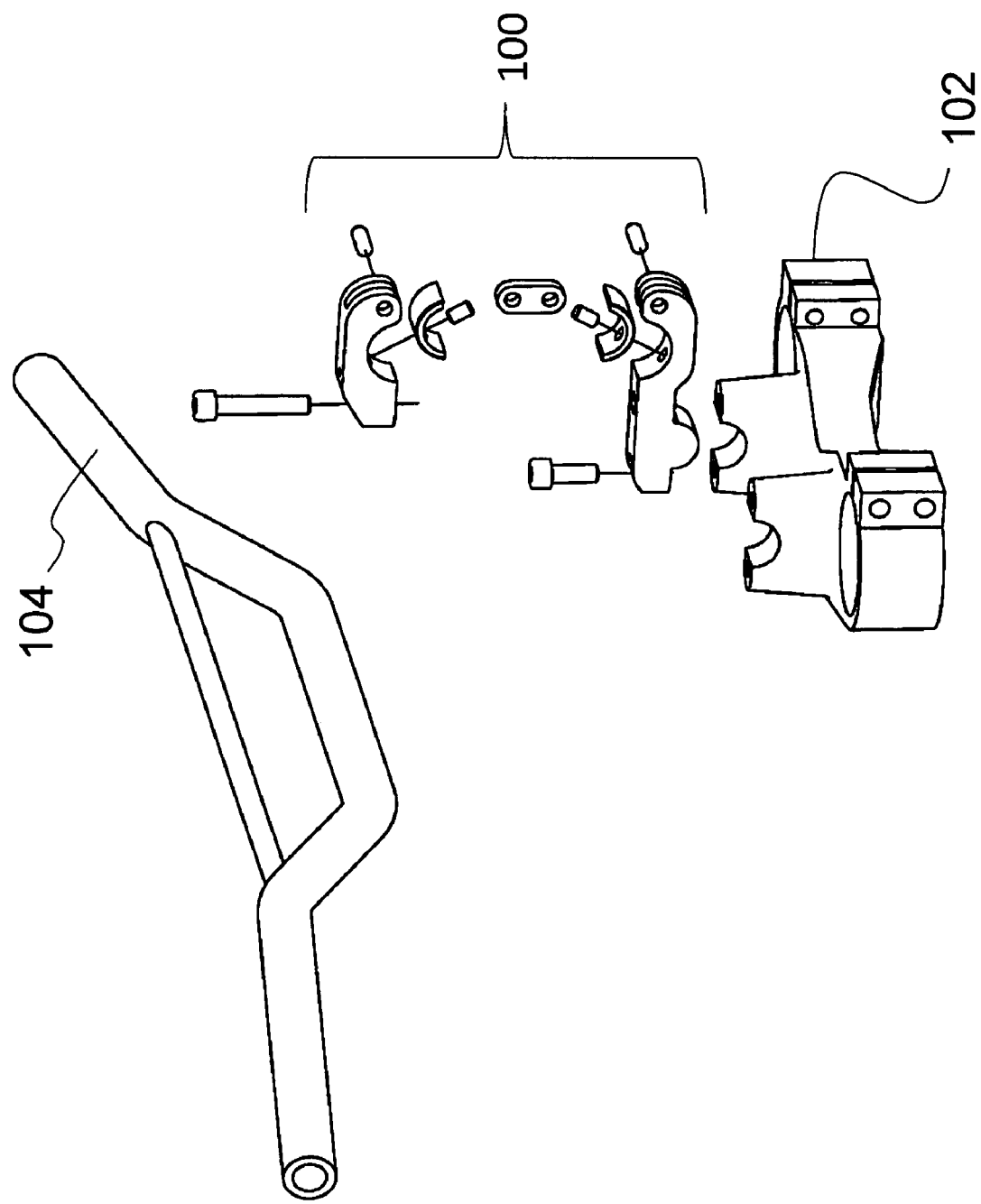
FIG. 3 is an exploded-view illustration of the handlebar clamp according to the present invention.

FIG. 3 is an illustration of the handle bar 104, fork clamp 102, and an exploded-view of the handlebar clamp 100. Further details of the handlebar clamp 100 are illustrated in FIG. 4.

Figure 4:
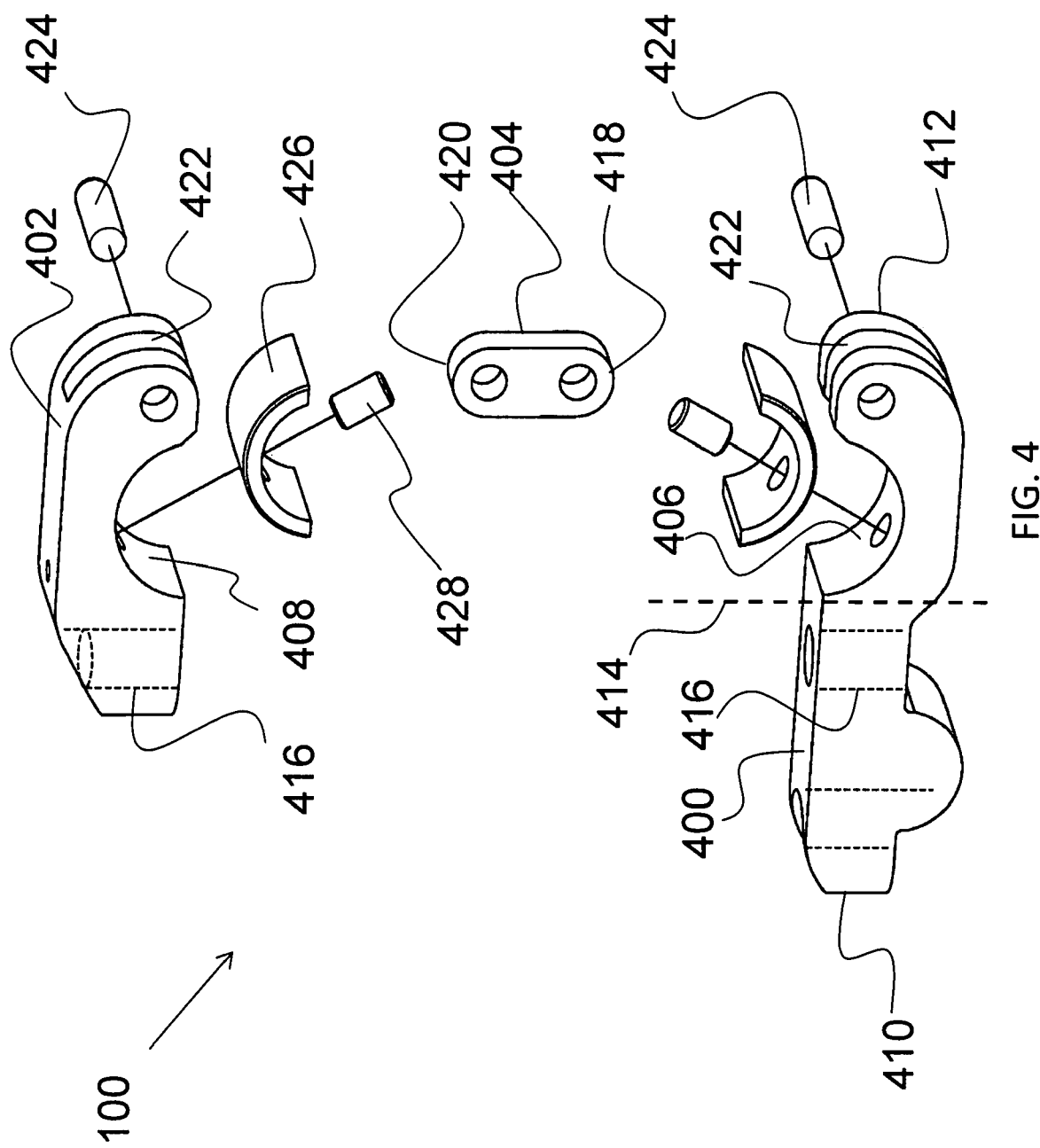
FIG. 4 is an exploded-view illustration of the handlebar clamp according to the present invention.

As shown in FIG. 4, the handlebar clamp 100 includes a base 400 and a cap 402 hingedly connected with the base 400. The base 400 is hingedly connected with the cap 402 through any suitable mechanism or device for hingedly connecting one object with another, non-limiting examples of which include using a single pin (illustrated in FIG. 9) or a linkage 404 with two pins 424. To accommodate the handlebar, both the base 400 and cap 402 include any suitable shape therein that allows the handlebar to be clamped therebetween. As a non-limiting example, the base 400 includes an arcuate recess 406 and the cap includes an arcuate recess 408. The arcuate recesses 406 and 408 are formed such that when the cap 402 is positioned upon the base 400, the arcuate recesses 406 and 408 are aligned to allow for placement of a handlebar therebetween. As required by the present invention, the base 400 is formed to align with and connect with the motorcycle's OEM fork clamp (illustrated as element 102 in FIGS. 1 through 3).

In order to alter the user's riding stance, the base 400 is an elongated base 400. In this aspect, the base 400 include a first portion 410, a second portion 412, and a center portion 414 therebetween. The arcuate recess 406 is formed in the base 400 such that it is offset from the center portion 414 and substantially within the second portion 412. Thus, when the handlebar is connected with the handlebar clamp 100, the handlebar is offset from the center portion 414 to reposition the handlebar and thereby alter the user's riding stance. As can be appreciated by one skilled in the art, the both the base 400 and the cap 402 include bolt holes 416 therethrough to allow the handlebar clamp 100 to be attached with the motorcycle's fork clamp.

As mentioned above, the base 400 is hingedly connected with the cap 402 through any suitable technique for hingedly connecting two objects together. An advantage of such a connection is that when the cap 402 is tightened against the base 400, the tightening process is simplified since turning a single fastener generates the required clamping force. Furthermore, it is impossible for the user to install the cap in the wrong orientation as can happen with the prior art design, thereby improving the reliability of the tightening process.

In one aspect, a link 404 is used to hingedly connect the base 400 with the cap 402. As can be appreciated by one skilled in the art, there are several methods by which one can use a link to hingedly connect two objects. For example, the link 404 has a first end 418 and a second end 420, with the first end 418 being pivotally connected with the base 400 and the second end 420 being pivotally connected with the cap 402. To facilitate such a connection, both the base 400 and cap 402 include a slot 422 therein. The link 404 is positioned within the slot 422 of each of the cap 402 and base 400. A pin 424 is used to pivotally connect the link 404 with each of the cap 402 and the base 400, thereby hingedly connecting the cap 402 with the base 400.

The present invention has been devised so that it can be used with a variety of OEM motorcycles and their handlebars. As can be appreciated, handlebars often come in various sizes. Thus, the present invention also includes an adapter to accommodate handlebars of varying diameters. For example, the present invention includes a set of arcuate adapters 426 that are formed to fit within the arcuate recesses 406 and 408.

Each arcuate adapter 426 can be affixed within the arcuate recesses 406 and 408 using any suitable connection mechanism or technique, non-limiting examples of which include a dowel pin 428 and a screw (not illustrated).

Figure 5:
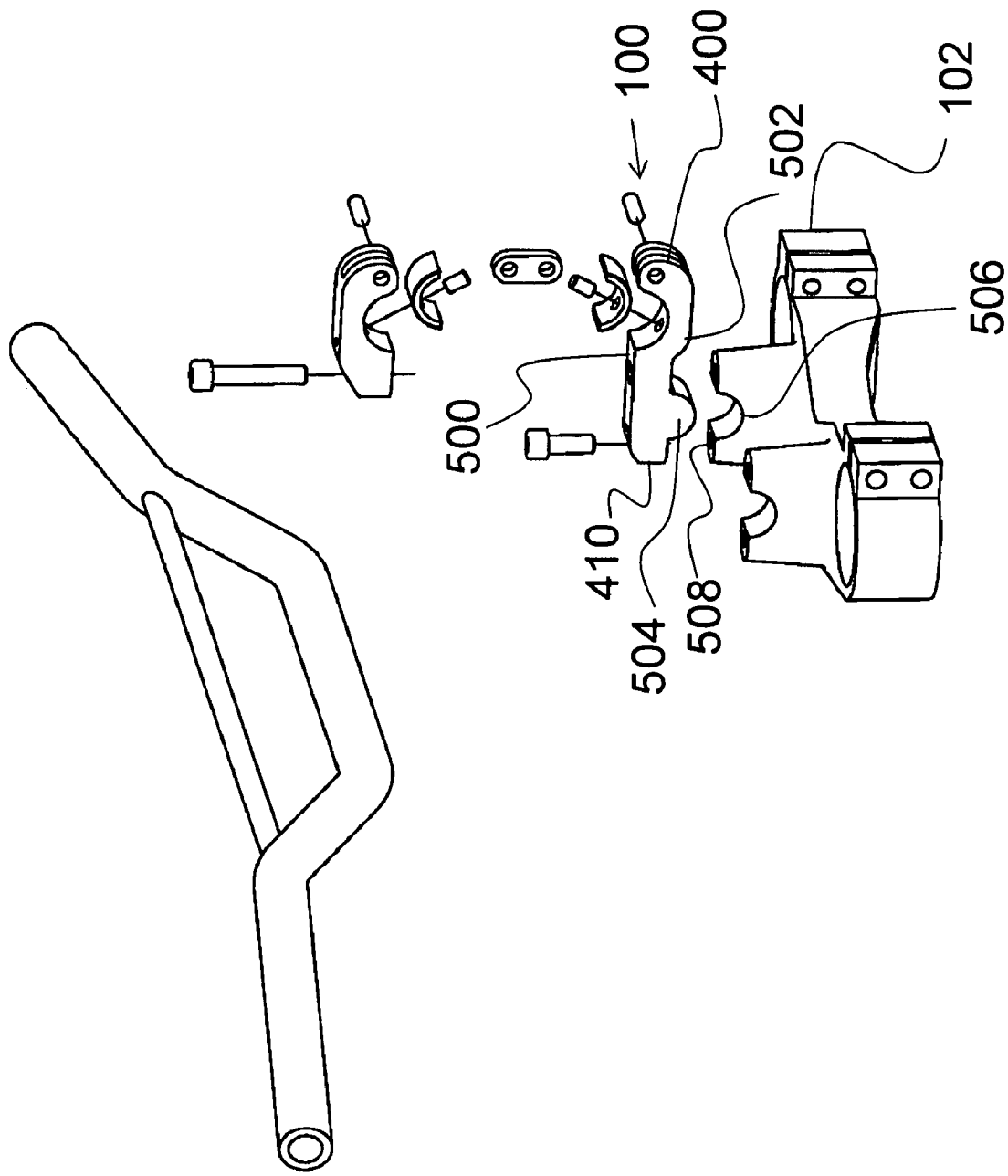
FIG. 5 is an exploded-view illustration of the handlebar clamp according to the present invention.

As discussed above, the handlebar clamp 100 is formed so that it can be attached with a variety of OEM motorcycles, including their various fork clamps. For example and as illustrated in FIG. 5, the base 400 includes a top side 500 and a bottom side 502. The base 400 is formed such that an arcuate protrusion 504 extends from the bottom side 502 of the first portion 410. The arcuate protrusion 504 is formed such that it aligns with and mates with a corresponding arcuate recess 506 in the motorcycle's fork clamp 102. As can be appreciated by one skilled in the art, when the arcuate protrusion 504 is positioned within the arcuate recess 506 of the fork clamp 102, the bolt holes (illustrated as element 416 in FIG. 4) are aligned with corresponding threaded holes 508 in the fork clamp 102. Such a configuration allows the base 400 to be secured in place with the fork clamp 102.

Figure 6:
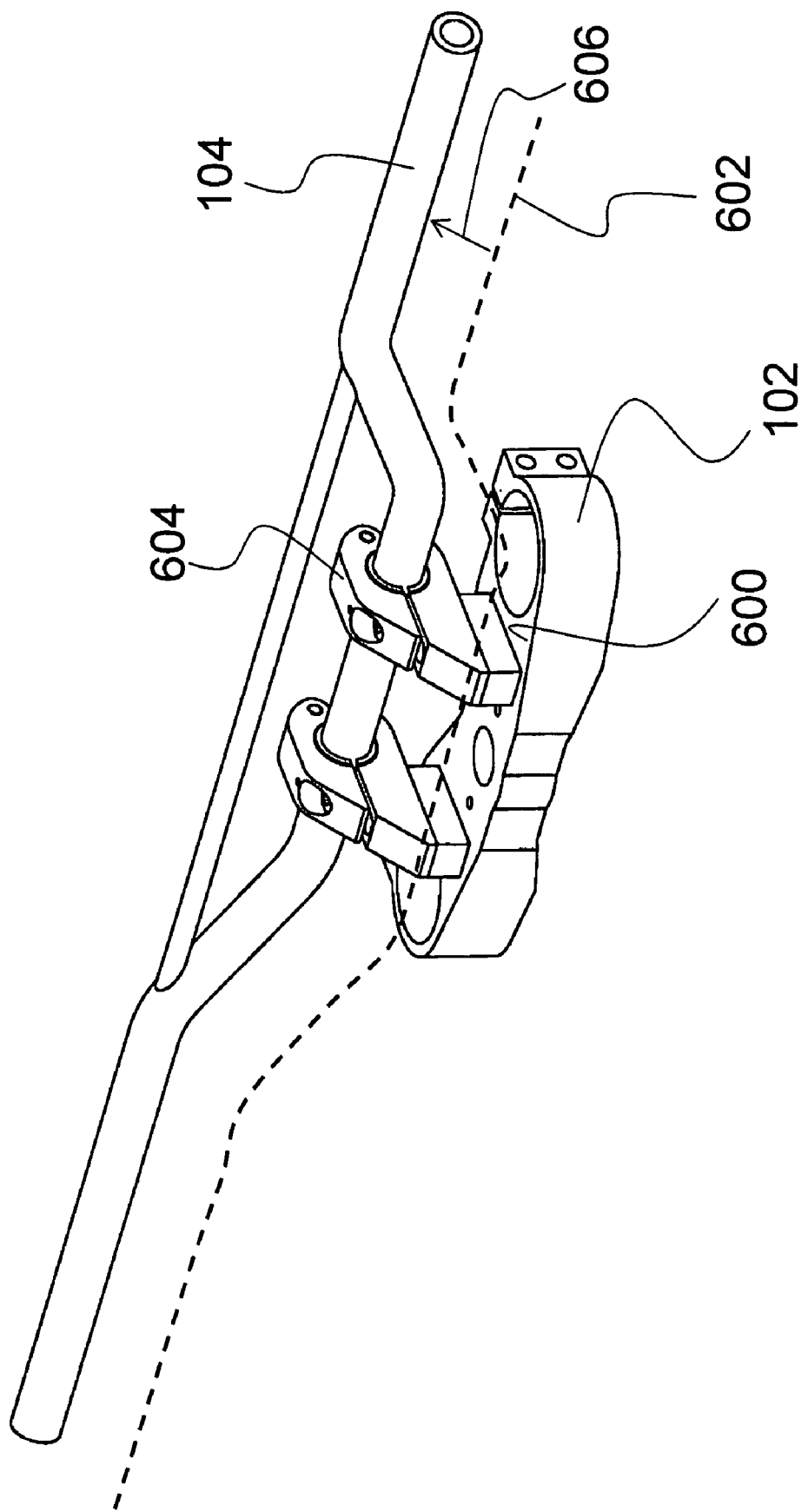
FIG. 6 is a rear, perspective-view illustration of a handlebar clamp according to the present invention, depicted as being connected with a handlebar and with a fork clamp by a riser.

Another aspect is illustrated in FIG. 6. As can be appreciated by one skilled in the art, not all OEM motorcycle fork clamps are equipped with arcuate recesses (illustrated as element 506 in FIG. 5) to accommodate a handlebar. Other fork clamps 102, as illustrated in FIG. 6, include a flat surface 600. In this configuration, an OEM handlebar clamp (not shown) is typically affixed with the fork clamp 102 to hold the handlebar 104 in place. The dotted line 602 depicts the standard position of the handlebar 104 when using an OEM handlebar clamp. As shown, the handlebar clamp 604 of the present invention extends 606 the handlebar 104 to a new position. For example, the handlebar clamp 604 extends 606 the handlebar 104 to a more forward and upward position to alter the user's riding stance.

Figure 7:
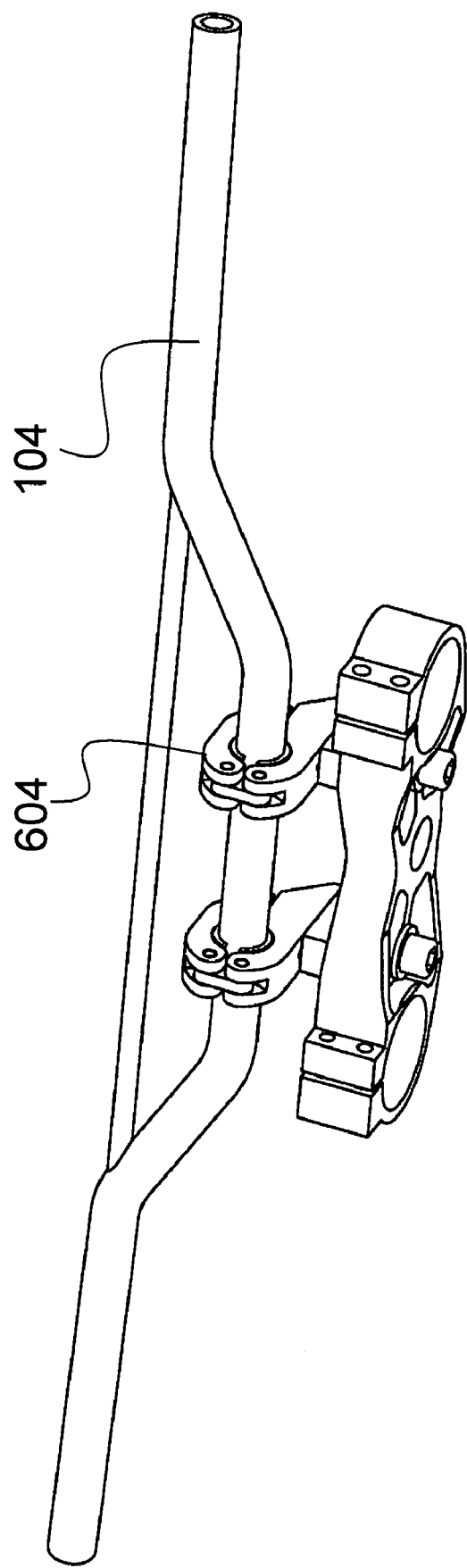
FIG. 7 is a front, perspective-view illustration of a handlebar clamp according to the present invention, depicted as being connected with a handlebar and with a fork clamp by a riser.
Figure 8B:
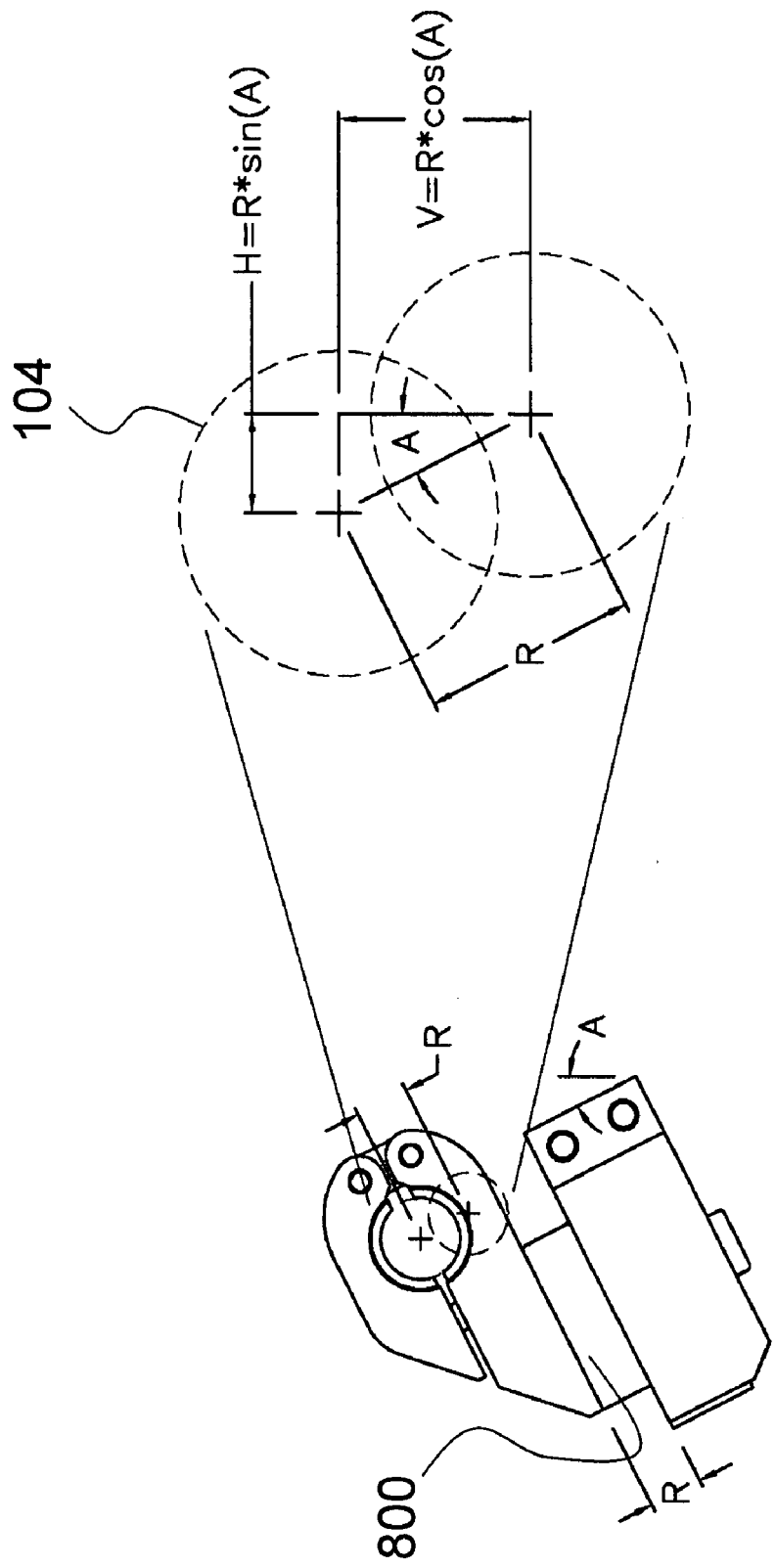
FIG. 8B is an illustration of the handlebar clamp and the riser, depicting how handlebar vertical adjustment is affected by the rake angle when a riser is used in the assembly.

FIG. 7 is another illustration of the handlebar clamp 604, depicting the handlebar 104 in the new and more forward and upward position. Further details of the handlebar clamp 604 are shown in FIGS. 8A and 8B.

As shown in FIG. 8A and as was the case above, the handlebar clamp 604 includes a base 400 and a cap 402, with the cap 402 being hingedly connected with the base 400. The base 400 includes a top side 500 and a bottom side 502, with an arcuate recess 406 formed on the top side 500. The cap 402 also includes a corresponding arcuate recess 408 to affix the handlebar 104 between the base 400 and the cap 402. Also as was the case above, the base 400 includes a first portion 410 and a second portion 412, with the arcuate recess 406 being formed substantially within the second portion 412.

Additionally, the present invention includes a riser block 800 that can be used to raise and alter the position of the handlebar clamp 604. The riser block 800 includes a connection mechanism for securely connecting the riser block 800 with the handlebar clamp 604. The connection mechanism is any suitable mechanism or device for securing one object with another, a non-limiting example of which includes a pair of protrusions 802. When a pair of protrusions 802 is used, the base 400 includes a pair of depressions 804 formed substantially within the first portion 410 of the bottom side 502. The pair of depressions 804 corresponds to the pair of protrusions 802 on the riser block 800 to allow a fixed connection therebetween. As can be appreciated by one skilled in the art, the present invention is not intended to be limited to a pair or protrusions 802 and corresponding depressions 804 as there are a multitude of configurations that enable such a mating connection. For example, the depressions 804 can instead be holes formed through the riser block 800, with the holes being formed to receive the protrusions 802. Thus, although listed as depressions, the pair of depressions 804 are any suitable mating configuration, including holes, slots, etc.

Additionally, both the base 400 and riser block 800 include bolt holes therethrough. When the pair of protrusions 802 are mated with the pair of depressions 804, the bolt holes are aligned to allow user to pass a bolt 806 through the motorcycle fork clamp 102, through the riser block 800 and into the base 400 to allow the handlebar clamp 604 to be affixed with the fork clamp 102. Alternatively (not shown), the pieces can be formed such that the bolt 806 can be passed through the base 400, through the riser block 800, and into the handlebar clamp 604. In either case, the bolt holes are aligned to allow the handlebar clamp 604 and riser 800 to be affixed with the fork clamp 102.

As shown in FIG. 8B and as described above, the position of the handlebar 104 can be altered through use of the riser block 800. FIG. 8B illustrates how horizontal (H) handlebar 104 movement and vertical (V) handlebar 104 movement are dependent on the height (R) of the riser block 800 as a function of rake angle (A). The horizontal (H) and vertical (V) movements can be calculated according to the following:

$H = V*\text{sine}(A)$ and $V = R*\text{cosine}(A)$, where * denotes multiplication.

Figure 11E:
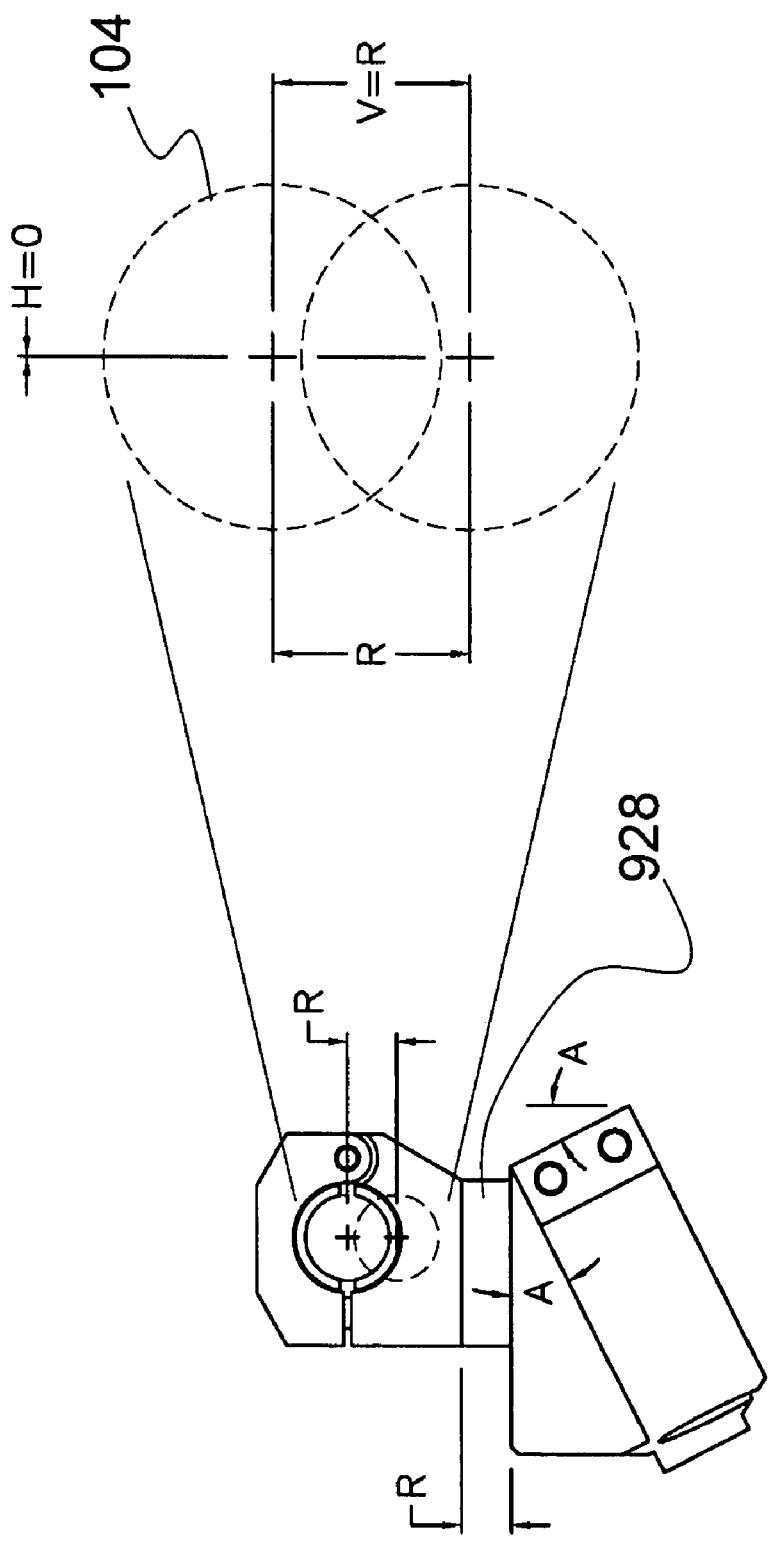
FIG. 11E is an illustration of the handlebar clamp and the riser, depicting how handlebar vertical adjustment is not affected by the rake angle when a riser block is used in the assembly.

As can be appreciated by one skilled in the art, both the rake angle (A) and the height (R) of the riser block 800 can be altered to affect the horizontal (H) and vertical (V) movements of the handlebar 104. For example, many motorcycle forks and corresponding fork clamps are formed such that A=27 degrees. However, as the rake angle (A) changes, so will both of the horizontal (V) and vertical (V) movements. Thus, because of the rake angle (A), the horizontal (H) and vertical (V) movements are not independent of one another. This is to be contrasted with the next fork clamp configuration, where each of the horizontal (H) and vertical (V) movements is independent of one another (as illustrated in FIG. 11E).

Figure 9:
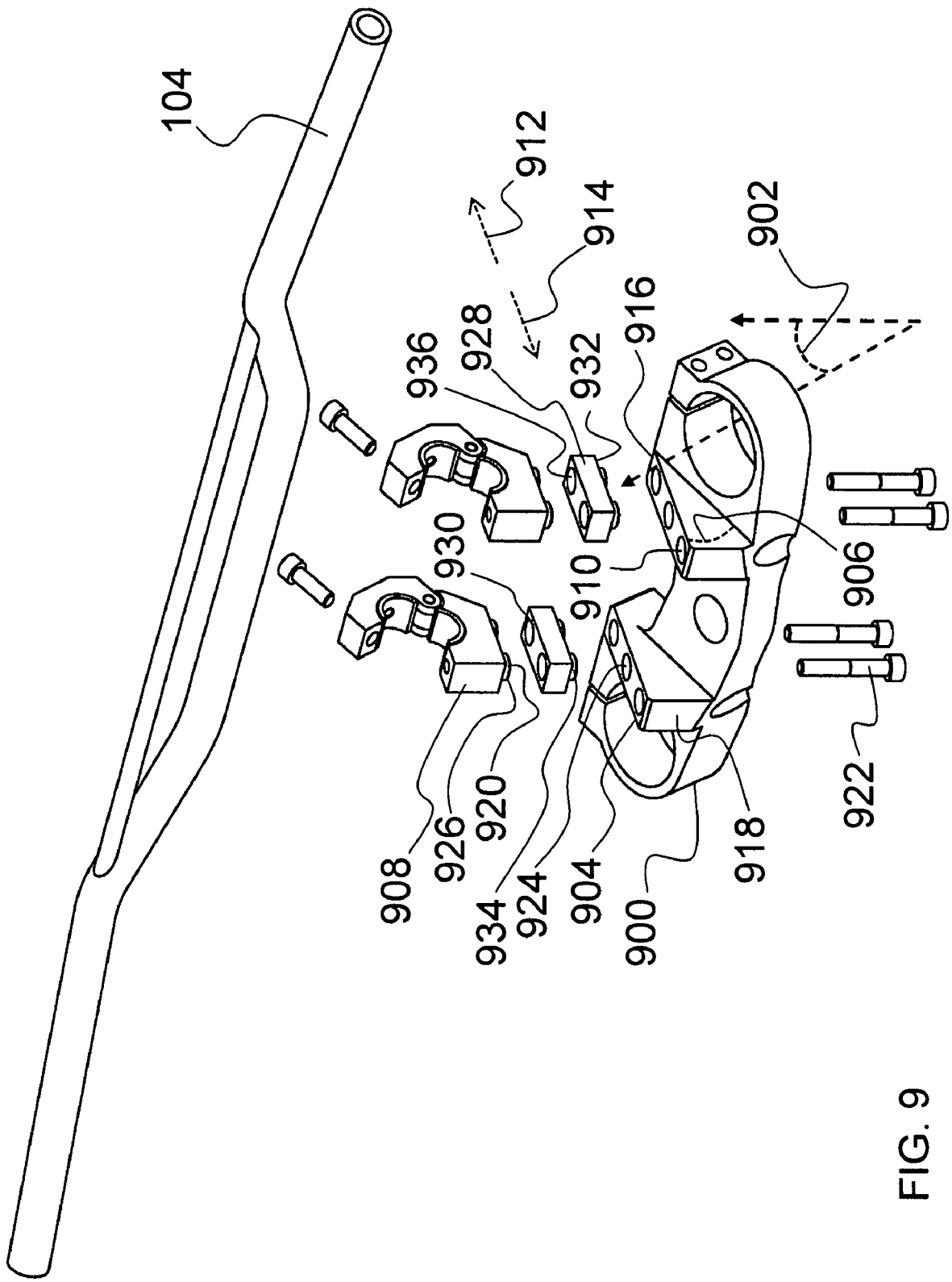
FIG. 9 is an exploded-view illustration of the handlebar clamp and fork clamp according to the present invention.

As mentioned above, not all fork clamps are alike. To allow for independent handlebar position adjustment in two dimensions (fore/aft and up/down), the present invention also includes a motorcycle fork clamp. As shown in FIG. 9, the fork clamp 900 is formed to create a substantially horizontal (with respect to a ground surface) mounting surface.

As can be appreciated by one skilled in the art, motorcycle forks are typically mounted with a fork clamp at a rake angle 902. To compensate for the rake angle 902, the fork clamp 900 includes a horizontal mounting surface 904. The horizontal mounting surface 904 is angled 906 with respect to the fork long axis such that when the fork clamp 900 is attached with motorcycle forks to the motorcycle frame, the angle 906 of the horizontal mounting surface 904 offsets the rake angle 902 to cause the horizontal mounting surface 904 to rest in a substantially level (i.e., parallel) alignment with respect to a ground surface.

The fork clamp 900 is further formed to allow for adjustability of a bar clamp 908. In such an aspect, the fork clamp 900 includes an adjustment apparatus 910 for connecting with the bar clamp 908. The adjustment apparatus 910 is any suitable mechanism or device that allows for fore 912 and aft 914 connection positions with the bar clamp 104. As a non-limiting example, the horizontal mounting surface 904 includes a fore side 916 and an aft side 918, with three bolt holes formed through the horizontal mounting surface 904. The bolt holes are formed in linear alignment from the fore side 916 to the aft side 918. Additionally, the bar clamp 908 includes any suitable number of receiving mechanisms 920 (e.g., two) for receiving bolts 922 (e.g., two) positioned through two of the three bolt holes. The receiving mechanism 920 is any suitable mechanism or device capable of connecting with a bolt, a non-limiting example of which includes a threaded bolt hole. Thus, a user can selectively adjust a fore 912 and aft 914 position of the bar clamp 908 by selecting two of the three bolt holes for use with connecting the bar clamp 908 to the fork clamp 900.

To further mate the fork clamp 900 with the bar clamp 908, the fork clamp 900 includes depressions 924 formed proximate the bolt holes while the bar clamp 908 includes corresponding protrusions 926 proximate the receiving mechanisms 920. Each of the depressions 924 and protrusions 926 are formed at any suitable location to mate with one another. For example, each depression 924 is formed concentrically with a bolt hole to surround the bolt hole, while each protrusion 926 is formed concentrically with a receiving mechanism 920 to surround the receiving mechanism 920. Thus, the bar clamp 908 can be affixed with the fork clamp 900 by mating the protrusions 926 with the corresponding depressions 924.

Additionally, a riser 928 can also be used between the fork clamp 900 (i.e., the horizontal mounting surface 904) and the bar clamp 908 to raise the bar clamp 908 and thereby alter the user's riding stance. As was the case above, the riser 928 is connected between the fork clamp 900 and bar clamp 908 using any suitable mechanism or device. As a non-limiting example, the riser 928 includes a top side 930 and a bottom side 932, with the bottom side 932 having protrusions 934 that are formed to mate with the depressions 924 in the horizontal mounting surface 904. Additionally, the top side 930 includes depressions 936 that are formed to mate with the protrusions 926 on the bar clamp 908.

Figure 10:
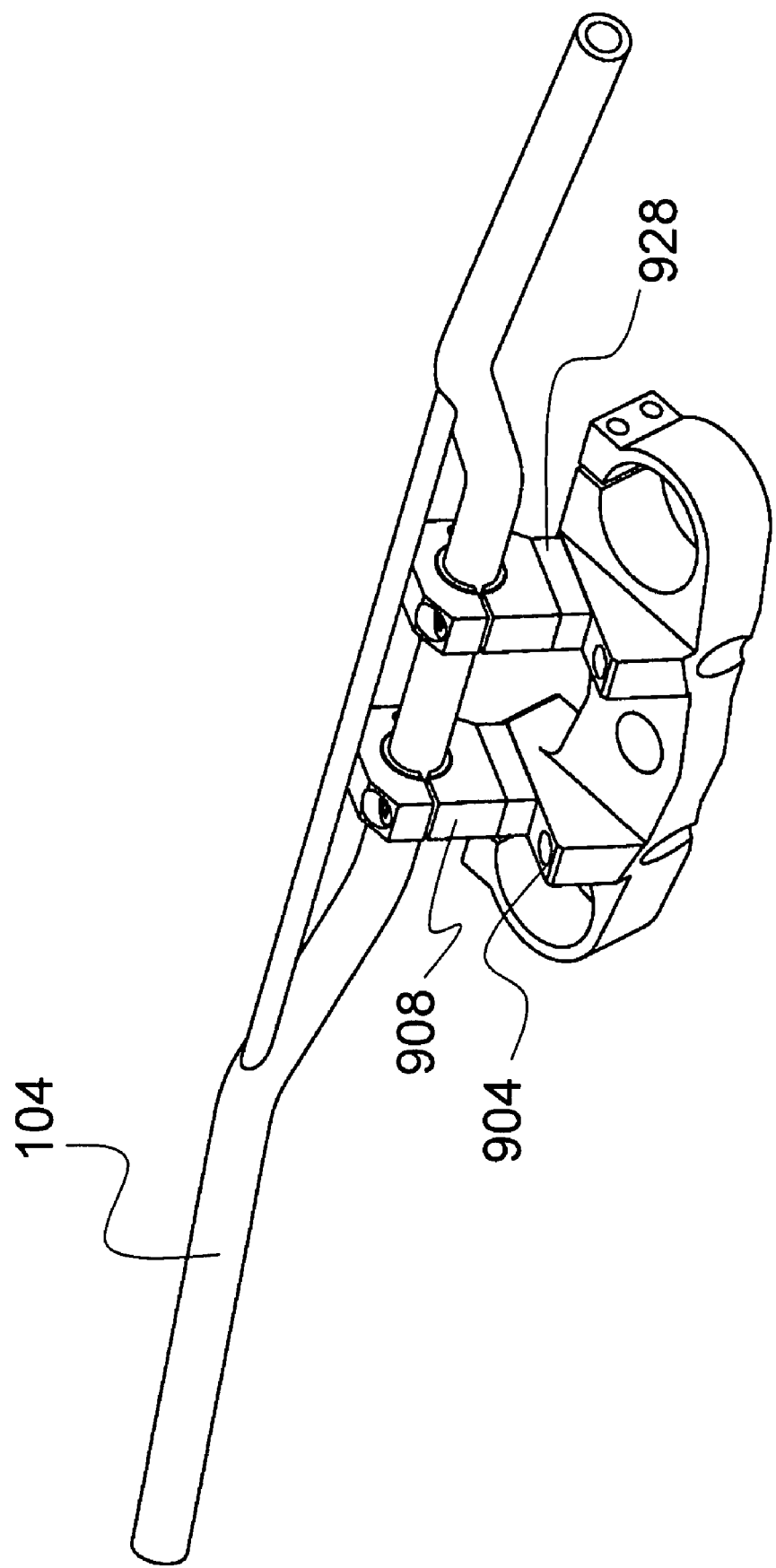
FIG. 10 is a rear, perspective-view illustration of the handlebar clamp and fork clamp according to the present invention.

As can be appreciated by one skilled in the art, the protrusions 926 and 934 and depressions 924 and 936 can be reversed and/or positioned at various locations throughout the riser 928, the bar clamp 908, and the fork clamp 900 to facilitate a similar mating connection as described above. For further illustration, FIG. 10 is a depiction of the handlebar 104 attached with the horizontal mounting surface 904 using both the riser 928 and the bar clamp 908.

FIGS. 11A through 11D further illustrate the effect of the riser. FIG. 11A is a side-view illustration of the bar clamp 908 connected with the fork clamp 900, without a riser. Alternatively and as shown in FIG. 11B, the riser 928 can be positioned between the fork clamp 900 and bar clamp 908 to ultimately raise the level of the handlebar 104. As can be appreciated by one skilled in the art, risers 928 of various sizes can be used to further allow a user to selectively alter the user's riding stance. For example, FIG. 11C illustrates a riser 928 that is taller than that of the riser 928 illustrated in FIG. 11B. Thus, use of the riser 928 in FIG. 11C will raise the handlebar 104 to a level that is higher than that of the raised handlebar 104 of FIG. 11B. FIG. 11D further illustrates this concept as an overlaid image that depicts the various positions of the handlebars 104 of FIGS. 11A through 11C. As shown in FIG. 11D, the bar clamp 908 can be attached with the fork clamp 900 without a riser, resulting in the handlebar 104 being held in a first elevated position 1100. Use of the riser 928 of FIG. 11B results in the handlebar 104 being held in a second elevated position 1102, while use of the riser of FIG. 11C results in the handlebar 104 being held in a third elevated position 1104. Thus, using the riser 928, a user is able to selectively raise (elevate) the handlebar 104 and thereby alter a height of the user's riding stance by vertically adjusting the handlebar 104 height.

In this aspect and as shown in FIG. 11E, the horizontal (H) and vertical (V) movements of the handlebar 104 are independent of each other when using the riser 928. As described above, the angle of the horizontal mounting surface offsets the rake angle (A) to cause the horizontal mounting surface to rest in a substantially level (e.g., parallel) alignment with respect to a ground surface. Therefore, using the riser 928, the horizontal (H) movement is zero, while the vertical (V) movement is equal to the height (R) of the riser 928. Or in other words, when the height (R) of the riser block 928 is increased, the vertical (V) movement is increased by the same amount; however, the horizontal (H) movement (adjustment) does not change (i.e., H=0).

In addition to being vertically adjustable, the present invention enables for a horizontal adjustment. As shown in FIGS. 12A through 12E, the bar clamp 908 is formed such that the arcuate recess (for holding the handlebar 104) is offset from the center portion 414 of the bar clamp 908. By being offset from the center portion 414, the bar clamp 908 can be reversibly connected with the fork clamp 900 to allow a user to selectively position the handlebar 104 in fore and aft positions. Additionally, using the adjustment apparatus (element 910 in FIG. 9), a user can further adjust the horizontal positioning of the bar clamp 908 and handlebar 104. FIG. 12E further illustrates this concept as an overlaid image that depicts the various positions of the handlebars 104 of FIGS. 12A through 12D.

As described above, the present invention allows a user to reposition the handlebar in a variety of positions. For example, FIGS. 1 through 5 depict a handlebar clamp that allows a user to shift the handlebar forward. In addition to shifting the handlebar forward, FIGS. 6 through 8 depict an aspect that allows a user to selectively adjust the height of the handlebar using a riser block. In this aspect, however, the actual handlebar movements are not independent (i.e., the riser block moves the bar upward but also backward by a certain amount). FIGS. 9 through 12E illustrate another aspect that overcomes the dependence issue (of the aspect illustrated in FIGS. 6 through 8B) by horizontally leveling the mounting surface of the risers (i.e., offsets the rake angle). In this aspect, the handlebar can be moved vertically without moving backward. Therefore, the present invention allows a user to both adjust the vertical and horizontal positioning of the handlebar 104 to alter a user's riding stance.

(1.2) Footpeg Extension

As mentioned above, the present invention allows a user to alter a motorcycle's riding stance by repositioning both the motorcycle's OEM handlebar and footpeg. Such an alteration is accomplished through both a handlebar clamp and a footpeg extension. The handlebar clamp was described above, while the footpeg extension is described below.

Figure 13:
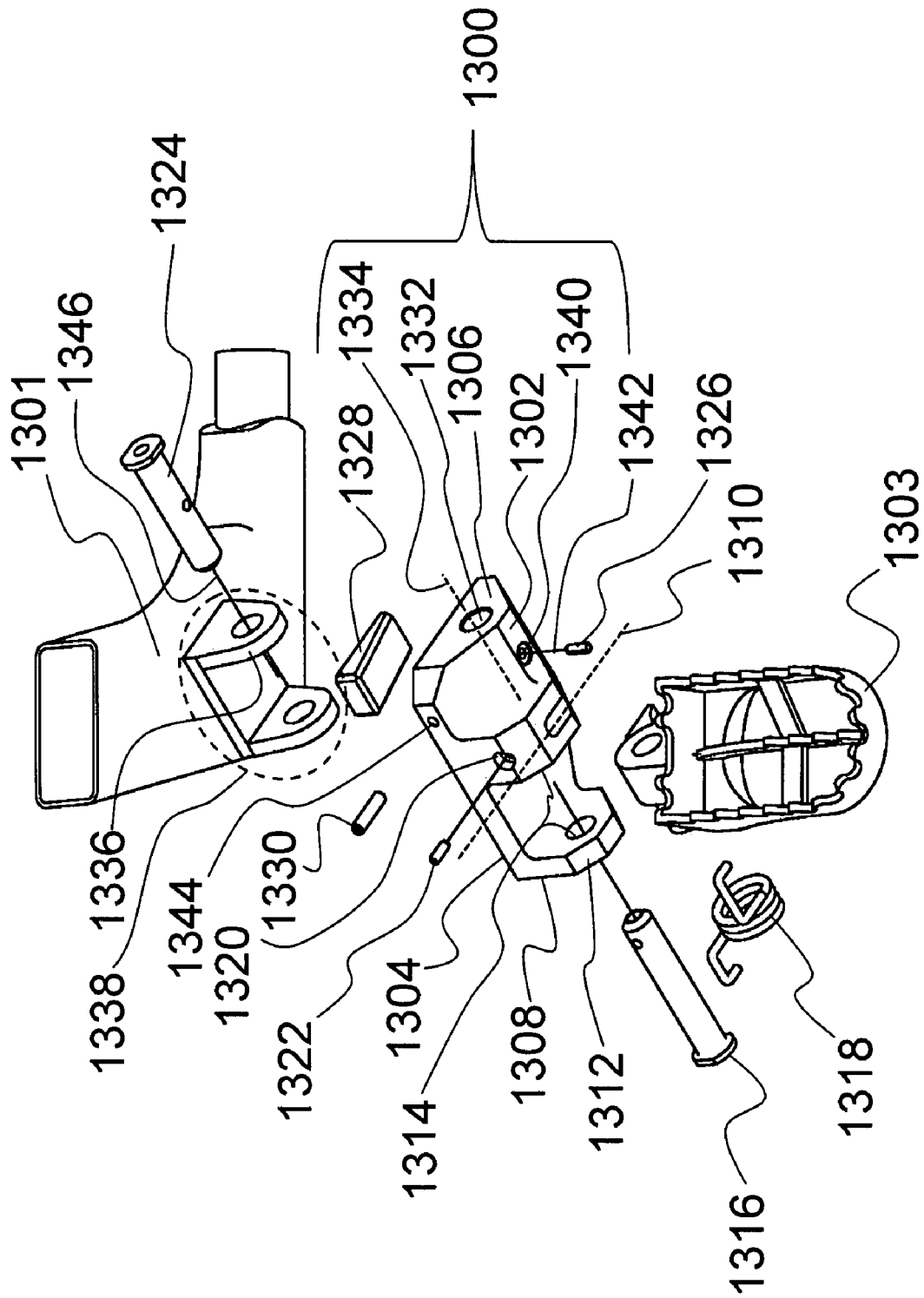
FIG. 13 is an exploded-view illustration of a footpeg extension according to the present invention.

As shown in FIG. 13, the present invention further comprises a footpeg extension 1300 for connecting with a motorcycle frame 1301. The footpeg extension 1300 effectively allows a user to reposition the motorcycle's OEM footpeg 1303.

The footpeg extension 1300 has a first side 1302 and a second side 1304. Additionally, the footpeg extension 1300 is elongated to have a first portion 1306, a second portion 1308, and a center portion 1310 therebetween. To allow a user to connect the footpeg 1303 with the motorcycle frame 1301, the footpeg extension 1300 includes a footpeg mount 1312 that is formed to connect with the footpeg 1303. The footpeg mount 1312 is attached with (i.e., formed with or separately formed and attached with) the first side 1302 such that the footpeg mount 1312 is offset from the center portion 1310 and substantially within the second portion 1308. Thus, using the present invention, a user can connect the footpeg extension 1300 with the motorcycle frame 1301 and connect the footpeg 1303 with the footpeg mount 1312 to alter the user's riding stance.

More specifically, the footpeg mount 1312 includes any suitable mechanism or device for connecting with the footpeg 1303. As a non-limiting example, the footpeg mount 1312 includes two footpeg mount pin bores 1314 therethrough to accommodate a footpeg mount pin 1316. Additionally, the footpeg mount 1312 includes a sufficient amount of space between the two footpeg mount pin bores 1314 to accommodate a motorcycle's OEM footpeg 1303 and OEM footpeg spring 1318 therebetween.

In order to affix the footpeg mount pin 1316 with the mount 1312, the mount 1312 further includes a retaining pin hole 1320 that intersects one of the footpeg mount pin bores 1314. The retaining pin hole 1320 allows a user to place a retaining pin 1322 through the retaining pin hole 1320 to engage with and affix the footpeg mount pin 1316 in place. As can be appreciated by one skilled in the art, there are multiple techniques by which a user can affix the footpeg mount pin 1316 with the footpeg mount 1312. Thus, the above example is a specific non-limiting example, as the present invention is not intended to be limited thereto.

When attaching the footpeg extension 1300 with the motorcycle frame 1301, it is important that the footpeg extension 1300 be securely affixed with the frame 1301. Thus, the footpeg extension 1300 is affixed with the frame 1301 through any suitable mechanism or device, three non-limiting examples of which are listed below.

For example, the present invention includes a clevis-pin 1324, a clevis-pin retaining pin 1326, a wedge block 1328, and a wedge block set screw 1330. In this aspect, the first portion 1306 includes a frame clevis-pin bore 1332 therethrough that has a long axis 1334. The long axis 1334 is alignable with flanges 1336 of an OEM footpeg clevis 1338 that are affixed to the motorcycle frame 1301. Thus, the footpeg extension 1300 can be attached with the motorcycle frame 1301 by inserting the clevis-pin 1324 through both the flanges 1336 and the clevis-pin bore 1332.

The first portion 1306 also includes a clevis-pin retaining pin hole 1340 with a long axis 1342 that approximately intersects the long axis 1334 of the clevis-pin bore 1332. When the clevis-pin 1324 is positioned through the clevis-pin bore 1332, the retaining pin 1326 can be placed through the retaining pin hole 1340 to engage with and hold the clevis-pin 1324 in place.

Additionally, the first portion 1306 also includes a tapered pocket (illustrated as element 1600 in FIG. 16) that is formed in the second side 1304 of the footpeg extension 1300. A hole 1344 (i.e. threaded hole) is formed through the footpeg extension 1300 to intersect the tapered pocket. Thus, the wedge block 1328 can be positioned in the tapered pocket with the wedge block set screw 1330 being screwed through the threaded hole 1344 to drive the wedge block 1328 into the tapered pocket. Tightening the wedge block set screw 1330 against the wedge block 1328 effectively prevents the footpeg extension 1300 from rotating about the long axis of the clevis-pin 1324.

Figure 14:
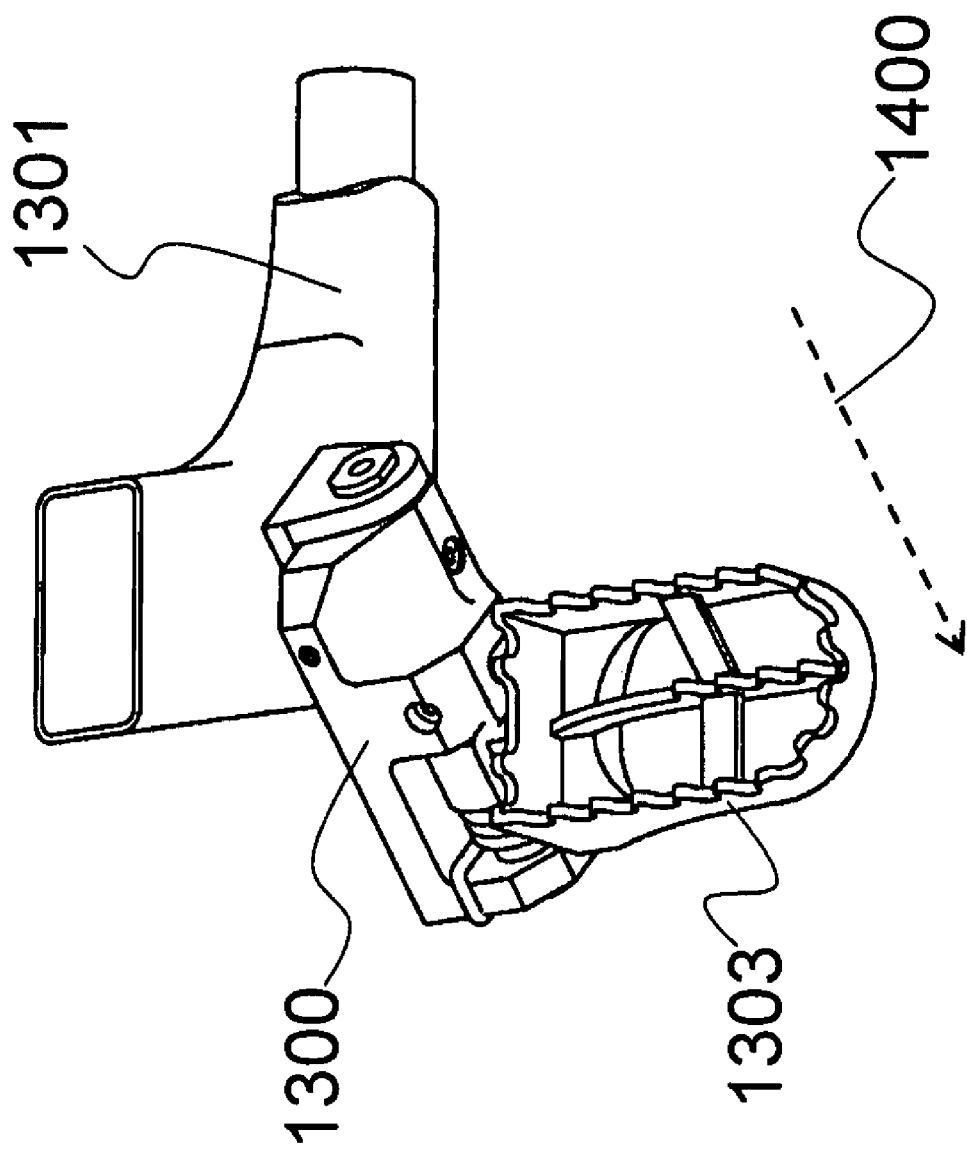
FIG. 14 is a perspective-view illustration of a footpeg extension according to the present invention, illustrating the footpeg extension as connected with both a motorcycle frame and footpeg.

FIG. 14 further illustrates the use of the footpeg extension 1300. As shown, the footpeg extension 1300 is connected with and between the motorcycle's footpeg 1303 and frame 1301, thereby moving the footpeg away 1400 from its OEM position and altering the user's riding stance.

Figure 15:
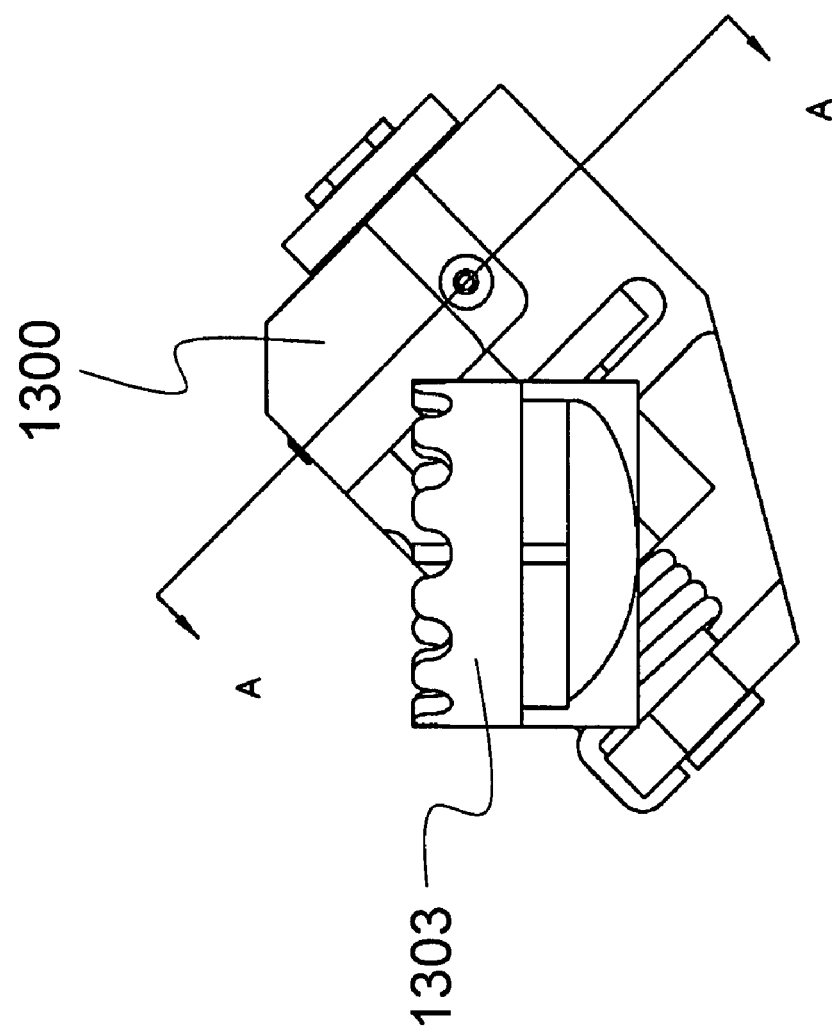
FIG. 15 is side-view illustration of the footpeg extension according to the present invention, depicting the footpeg in its new and altered position.
Figure 16:
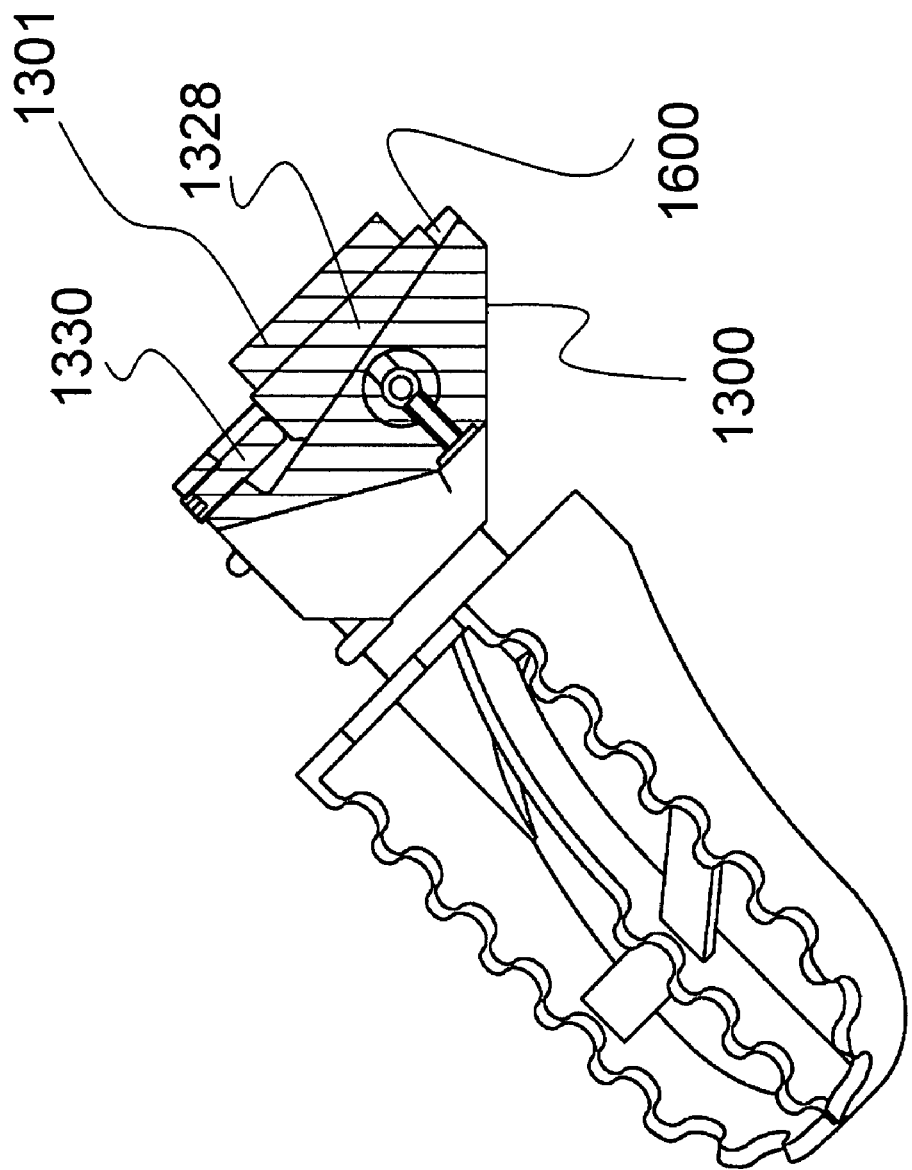
FIG. 16 is a cross-sectional view illustration of the footpeg extension, taken along section line A-A of FIG. 15.

FIG. 15 is side view illustration of the footpeg extension 1300, depicting the footpeg 1303 in its new and altered position. FIG. 16 is a cross-sectional view illustration of the footpeg extension 1300, taken along section line A-A of FIG. 15. As shown in FIG. 16, the wedge block 1328 is forced into the tapered pocket 1600 by the wedge block set screw 1330. As can be appreciated by one skilled in the art, the wedge block 1600 takes up any slack between the footpeg extension 1300 and the frame 1301 to secure the footpeg extension 1300 in place.

Figure 17:
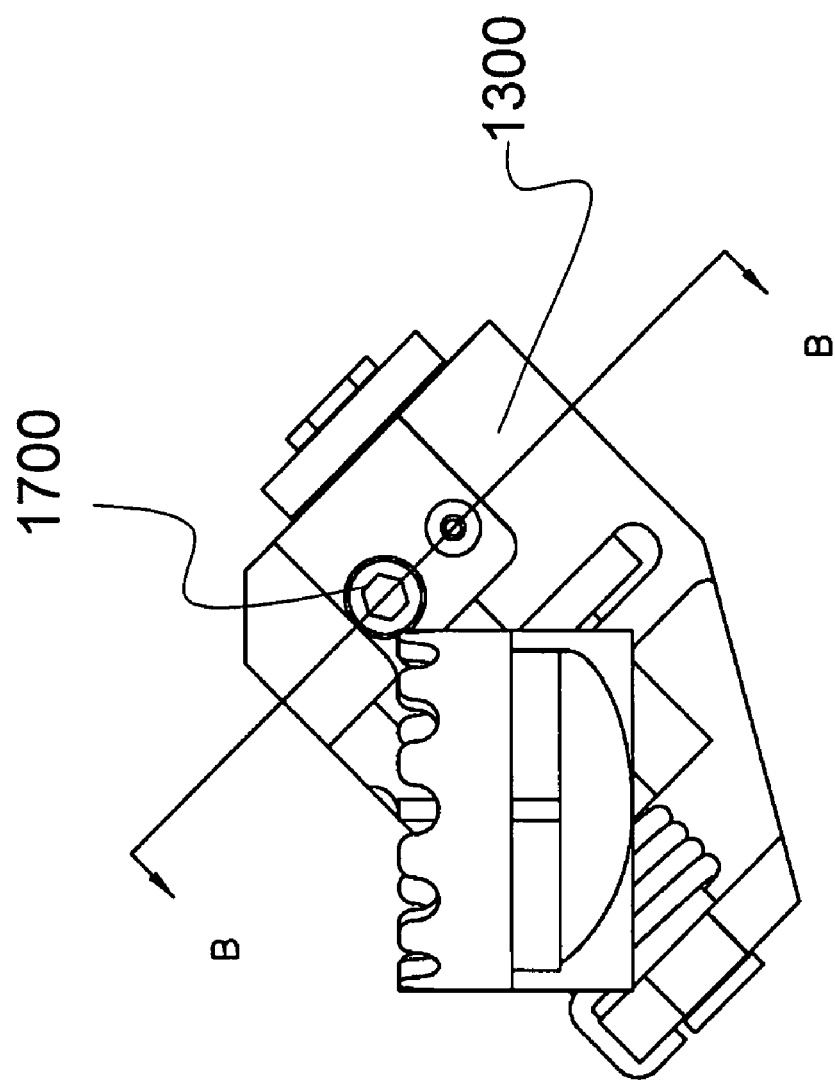
FIG. 17 is side-view illustration of the footpeg extension according to the present invention, depicting the footpeg in its new and altered position.
Figure 18:
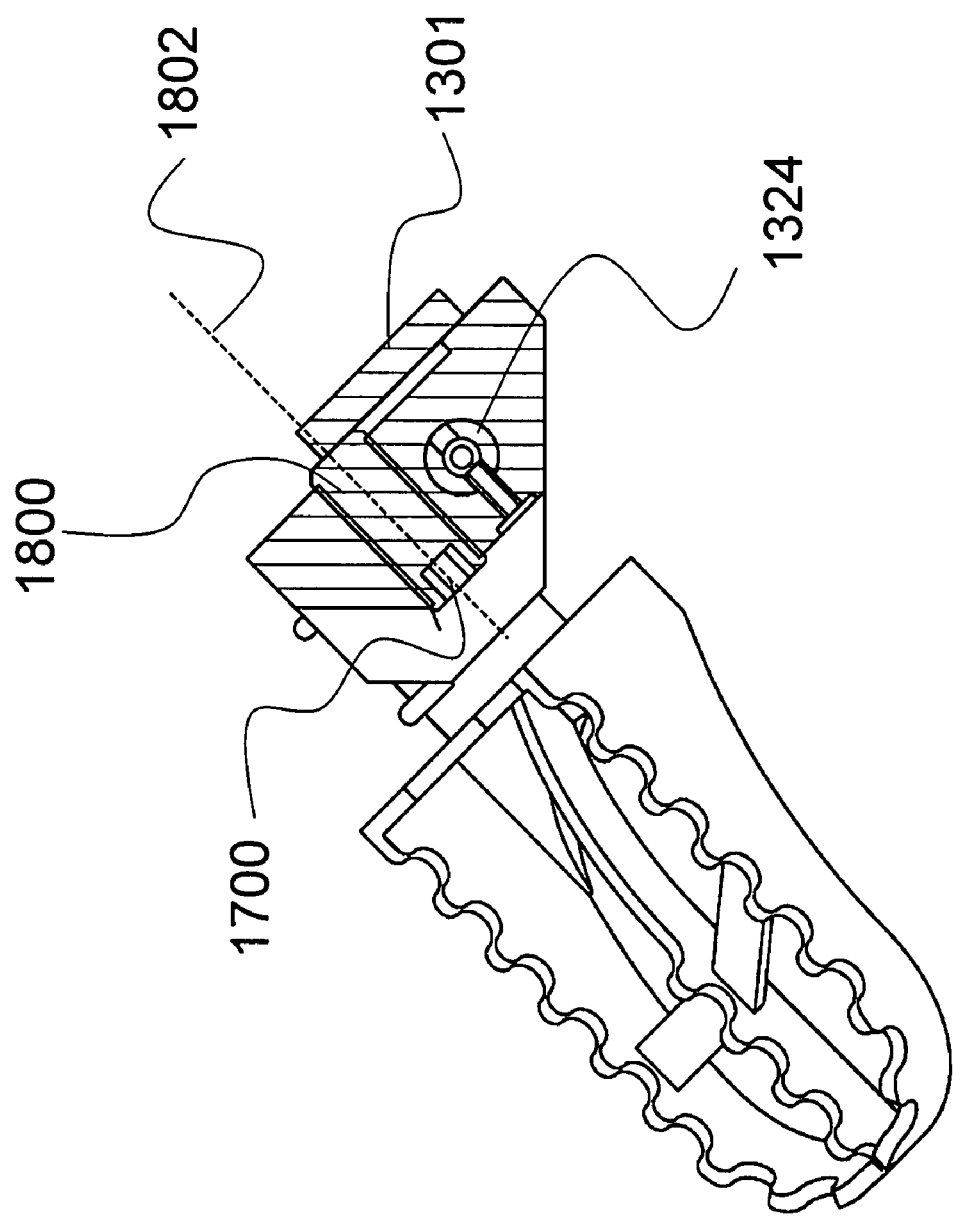
FIG. 18 is a cross-sectional view illustration of the footpeg extension, taken along section line B-B of FIG. 17.

As mentioned above, described herein are three examples for affixing the footpeg extension 1300 with the frame 1301. Instead of using a wedge block, the second example uses a set screw that can be tightened against the motorcycle frame. As shown in FIG. 17, the present invention also includes a set screw 1700 that can be used to tighten the footpeg extension 1300 directly against the frame. FIG. 18 further illustrates this concept by providing a cross-sectional view of the footpeg extension, taken along section line B-B of FIG. 17. As shown in FIG. 18, the present invention also includes a set screw hole 1800 therethrough that has a long axis 1802 that is aligned to contact the motorcycle frame 1301 (or footpeg clevis). The set screw hole 1800 is threaded to accommodate the set screw 1700. Thus, tightening the set screw 1700 against the frame 1301 (or clevis) prevents the footpeg extension from rotating about the long axis of the clevis-pin 1324.

Figure 19:
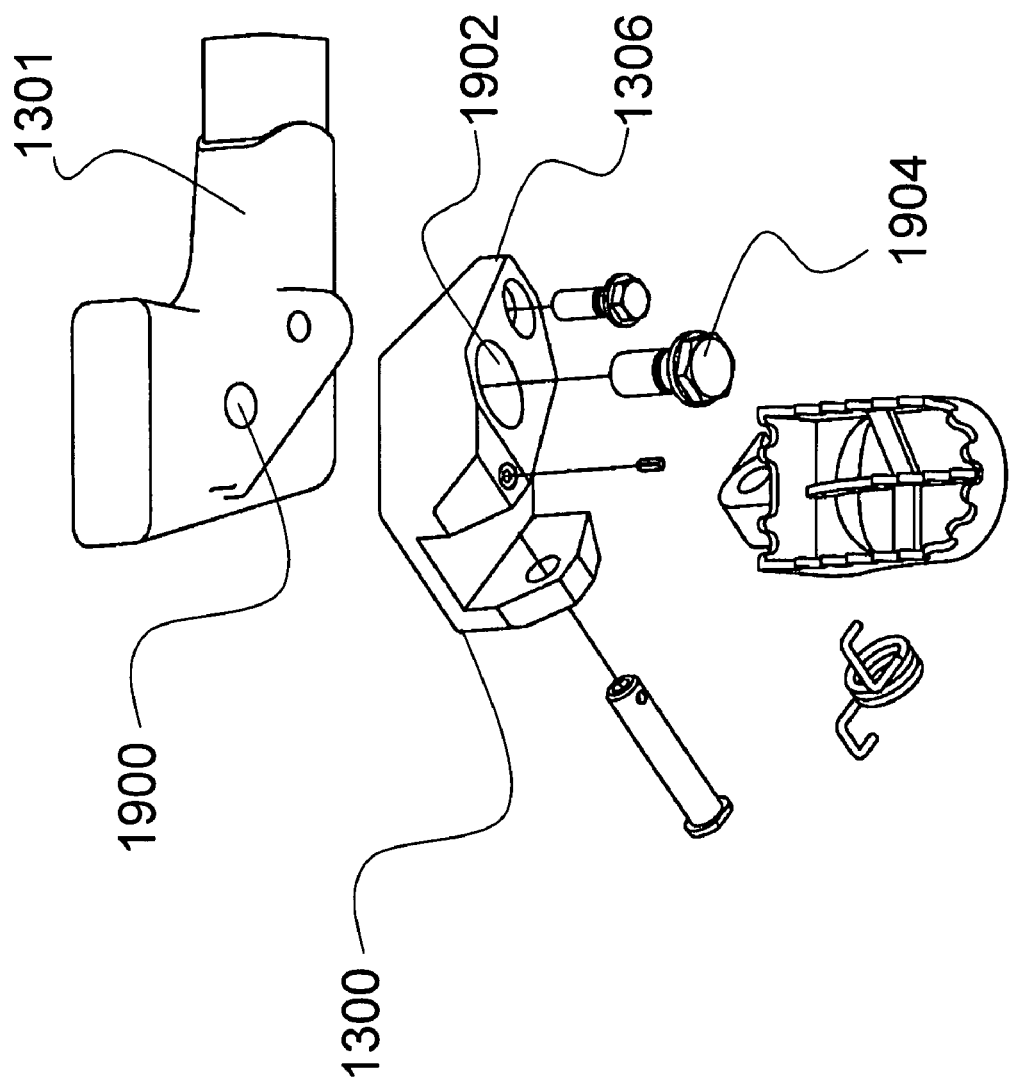
FIG. 19 is an exploded-view illustration of a footpeg extension according to the present invention.
Figure 20:
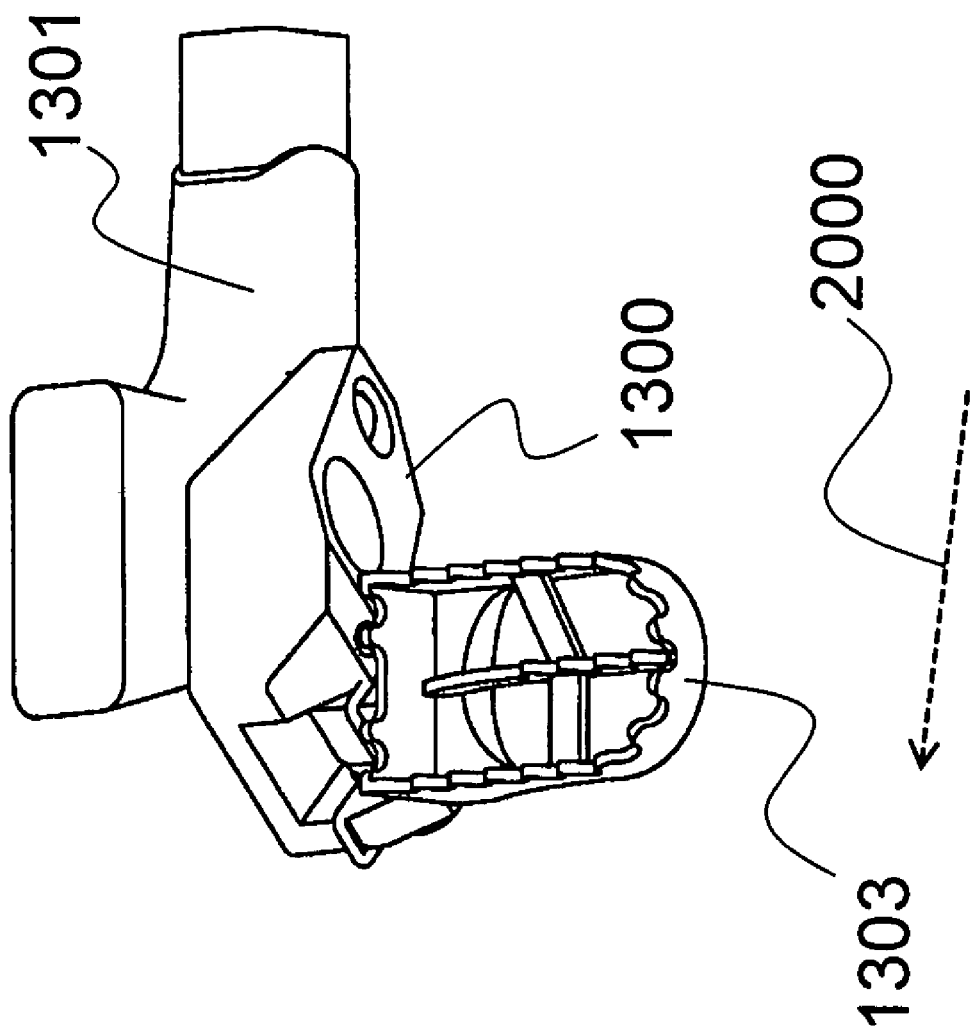
FIG. 20 is a perspective-view illustration of a footpeg extension according to the present invention, illustrating the footpeg extension as connected with both a motorcycle frame and footpeg.

The third example is illustrated in FIGS. 19 and 20. As can be appreciated by one skilled in the art, not all motorcycle frames include a permanently attached (e.g., welded on) footpeg clevis. In some cases and as illustrated in FIG. 19, the motorcycle frame 1301 can include a pair (or any other number) of threaded holes 1900. To accommodate such motorcycles, the first portion 1306 includes a corresponding number (e.g., pair) of bolt holes 1902 therethrough. The bolt holes 1902 are formed to accommodate the OEM bolts 1904 and align with the corresponding threaded holes 1900 in the motorcycle frame 1301. Thus, a user can position the footpeg extension 1300 against the motorcycle frame 1301 and use the OEM bolts 1904 to affix the footpeg extension 1300 with the motorcycle frame 1301.

FIG. 20 further illustrates the use of the footpeg extension 1300. As shown, the footpeg extension 1300 is connected with and between the motorcycle's footpeg 1303 and frame 1301, thereby moving the footpeg away 2000 from its OEM position and altering the user's riding stance.

In summary, the present invention is a motorcycle-stance alteration kit for altering a user's riding stance. The present invention comprises a handlebar clamp, a fork clamp, and a footpeg extension. Each of the handlebar clamp, fork clamp, and footpeg extension are formed to attach with an OEM motorcycle frame and OEM accessories to reposition the motorcycle's handlebar and footpeg. Thus, repositioning the handlebar and footpeg effectively alters a motorcycle user's riding stance.

What is claimed is:

1. A motorcycle-stance alteration kit, comprising:
 a handlebar clamp for attaching with a motorcycle's fork clamp, the handlebar clamp having a base and a cap hingedly connected with the base, and where the base includes a recess therein and the cap also includes a recess, such that when the cap is positioned upon the base, the recesses are aligned to allow for placement of a handlebar therebetween, and where the base is formed to align with and connect with the motorcycle's fork clamp, with the base being an elongated base having a first portion, a second portion, and a center portion therebetween and where the recess is formed in the base such that it is offset from the center portion and substantially within the second portion, whereby use of the handlebar clamp allows a user to reposition a handlebar to alter a user's riding stance; and
 further comprising a link, the link having a first end and a second end, where the first end is pivotally connected with the base and the second end is pivotally connected with the cap, thereby hingedly connecting the base with the cap through the link.

2. A kit as set forth in claim 1, wherein the base includes a slot and the cap includes a slot, where the link is positioned within the slot of each the cap and base and affixed with each of the cap and the base using a pin to pivotally connect the link with each of the cap and base.

3. A kit as set forth in claim 2, further comprising a set of adapters for positioning within the recesses in order to accommodate a handlebar of varying diameters, each adapter being connected with a recess using a dowel pin.

4. A kit as set forth in claim 3, wherein the base includes a top side and a bottom side, with the recess being formed in the top side, and where the base further includes an protrusion extending from the bottom side of the first portion, the protrusion being formed to align with and mate with a corresponding recess in the motorcycle's fork clamp.

5. A kit as set forth in claim 3, further comprising a riser block having a pair of protrusions extending therefrom, and wherein the base includes a top side and a bottom side, with the recess being formed in the top side and a pair of depressions formed substantially within the first portion of the bottom side that correspond to the pair of protrusions on the riser block, and where both the base and riser block include a bolt hole therethrough such that when the pair of protrusions are connected with the pair of depressions, the bolt holes are aligned, thereby allowing a user to connect the riser block and base with a motorcycle's fork clamp to elevate a user's riding stance.

6. A motorcycle stance alteration kit, comprising:
 a motorcycle fork clamp, the fork clamp being formed to connect with motorcycle forks having a rake angle, the fork clamp having a horizontal mounting surface, with the horizontal mounting surface having an angle and being formed such that when the fork clamp is attached with motorcycle forks, the angle of the horizontal mounting surface offsets the rake angle to cause the horizontal mounting surface to rest in a substantially horizontal alignment with respect to a ground surface, the fork clamp also being formed to include an adjustment apparatus at the horizontal mounting surface for connecting with a bar clamp, the adjustment apparatus being formed to allow for fore and aft connection positions with the bar clamp; and
 a bar clamp for attaching with a motorcycle's handlebar, the bar clamp being formed to attach with the adjustment apparatus such that when connected with a handlebar, the bar clamp is used to attach the handlebar to the fork clamp, whereby a user can alter the riding stance by connecting the bar clamp at one of the fore and aft connection positions to adjust a position of an attached handlebar.

7. A kit as set forth in claim 6, wherein the horizontal mounting surface includes a fore side and an aft side, and the adjustment apparatus includes at least three bolt holes formed through the horizontal mounting surface, the bolt holes being formed in linear alignment from the fore side to the aft side, and wherein the bar clamp includes at least two receiving mechanisms for receiving two bolts positioned through two of the three bolt holes, thereby allowing a user to selectively adjust a fore and aft position of the bar clamp by selecting two of the three bolt holes for use with connecting the bar clamp to the fork clamp.

8. A kit as set forth in claim 7, wherein the receiving mechanisms are threaded bolt holes.

9. A kit as set forth in claim 8, wherein the fork clamp includes depressions formed proximate the bolt holes and the bar clamp includes corresponding protrusions proximate the receiving mechanisms, thereby allowing a user to affix the bar clamp with the fork clamp by mating the protrusions with the depressions.

10. A kit as set forth in claim 9, wherein the bar clamp includes a base and a cap hingedly connected with the base, and where the base includes a recess therein and the cap also includes a recess, such that when the cap is positioned upon the base, the recesses are aligned to allow for placement of a handlebar therebetween.

11. A kit as set forth in claim 10, wherein the base is an elongated base having a first portion, a second portion, and a center portion therebetween, and where the recess is formed in the base such that the recess is offset from the center portion and substantially within the second portion, and where the bar clamp is formed such that the bar clamp can be reversibly connected with the fork clamp such that second portion can be selectively positioned proximate the fore or aft positions of the fork clamp, whereby use of the bar clamp allows a user to reposition a handlebar to alter a user's riding stance.

12. A kit as set forth in claim 11, further comprising a riser configured to connect with and between the horizontal mounting surface and the bar clamp.

13. A kit as set forth in claim 12, wherein the riser includes a top side and a bottom side, where the bottom side includes protrusions formed to mate with the depressions in the horizontal mounting surface and the top side includes depressions formed to mate with the protrusions on the bar clamp.

* * * * *